(12) United States Patent
Sung

(10) Patent No.: US 12,311,581 B2
(45) Date of Patent: May 27, 2025

(54) ARTIFICIAL BOTANICALS AND METHODS OF MAKING SAME

(71) Applicant: Yi Hsuan Sung, Forest Hills, NJ (US)

(72) Inventor: Yi Hsuan Sung, Forest Hills, NJ (US)

( * ) Notice: Subject to any disclaimer, the term of this patent is extended or adjusted under 35 U.S.C. 154(b) by 0 days.

(21) Appl. No.: 18/404,986

(22) Filed: Jan. 5, 2024

(65) Prior Publication Data
US 2024/0190051 A1 Jun. 13, 2024

Related U.S. Application Data

(62) Division of application No. 17/219,987, filed on Apr. 1, 2021, now Pat. No. 11,872,727.
(Continued)

(51) Int. Cl.
B29C 39/00 (2006.01)
B29B 7/00 (2006.01)
(Continued)

(52) U.S. Cl.
CPC .............. *B29C 39/003* (2013.01); *B29B 7/90* (2013.01); *B29B 13/022* (2013.01); *B29C 39/02* (2013.01); *A41G 1/00* (2013.01); *B29K 2005/00* (2013.01); *B29K 2105/0032* (2013.01); *B29K 2509/10* (2013.01); *B29K 2511/10* (2013.01); *B29L 2031/7022* (2013.01); *C08J 2305/12* (2013.01);
(Continued)

(58) Field of Classification Search
CPC .............................................. B29L 2031/7022
See application file for complete search history.

(56) References Cited

U.S. PATENT DOCUMENTS 355,982 A 1/1887 Eggert, Jr.
901,319 A 10/1908 Bruen
(Continued)

FOREIGN PATENT DOCUMENTS

CN 1077098 10/1993
CN 1418587 5/2003
(Continued)

OTHER PUBLICATIONS

Bogers, Loes. Agar Foil—Mar. 24, 2020 https://class.textile-academy.org/2020/loes.bogers/files/recipes/agarfoil/ (Year: 2020).*
(Continued)

*Primary Examiner* — Alison L Hindenlang
*Assistant Examiner* — Andres E. Behrens, Jr.
(74) *Attorney, Agent, or Firm* — Law Office of Scott P. Zimmerman, PLLC

(57) ABSTRACT

An artificial flower, plant, or other botanical is produced from an aqueous agar-based solidifying mixture. The artificial botanical may be colored as desired by adding one or more colorants. The artificial botanical may also be scented by adding a perfume, odorant, or other scent. Because the artificial botanical is produced using the aqueous agar-based solidifying mixture, no animal-based gelatin products are used. The artificial botanical may thus also be edible and satisfies vegan diets. The artificial botanical may thus also be flavored by adding a flavoring, such as fruit, concentrate, or sweetener. The artificial botanical may be all-natural and edible by adding mica powder as the colorant and by adding glycerin as the flavoring.

20 Claims, 50 Drawing Sheets

Related U.S. Application Data

(60) Provisional application No. 63/006,112, filed on Apr. 7, 2020.

(51) Int. Cl.

| | | |
|---|---|---|
| *B29B 7/48* | (2006.01) | |
| *B29B 7/82* | (2006.01) | |
| *B29B 7/90* | (2006.01) | |
| *B29B 7/92* | (2006.01) | |
| *B29B 13/00* | (2006.01) | |
| *B29B 13/02* | (2006.01) | |
| *B29C 39/02* | (2006.01) | |
| *C09D 105/12* | (2006.01) | |
| *C09J 105/12* | (2006.01) | |
| *A41G 1/00* | (2006.01) | |
| *B29K 105/00* | (2006.01) | |
| *B29K 509/10* | (2006.01) | |
| *B29K 511/10* | (2006.01) | |
| *B29L 31/00* | (2006.01) | |

(52) U.S. Cl.
CPC ......... *C08J 2405/12* (2013.01); *C09D 105/12* (2013.01)

(56) References Cited

U.S. PATENT DOCUMENTS

| | | | | |
|---|---|---|---|---|
| 1,148,208 | A * | 7/1915 | Estelle | A47G 33/06 63/31 |
| 1,418,846 | A * | 6/1922 | Stevens | A41G 1/00 112/400 |
| 2,383,632 | A * | 8/1945 | Russell | C11C 3/003 554/175 |
| 2,879,617 | A | 3/1959 | Popeil | |
| 3,137,610 | A | 6/1964 | Flynn | |
| 4,788,085 | A | 11/1988 | DeLuca et al. | |
| 4,880,621 | A | 11/1989 | Grollier et al. | |
| 4,957,787 | A * | 9/1990 | Reinhardt | C08J 9/28 428/905 |
| 5,540,921 | A | 7/1996 | Tanaka | |
| 6,231,935 | B1 | 5/2001 | Fukunaga | |
| 6,395,114 | B1 | 5/2002 | Benado | |
| 6,417,119 | B1 | 7/2002 | Roberson | |
| 6,830,733 | B2 * | 12/2004 | Stanley, III | A61L 9/122 422/123 |
| 8,991,026 | B2 | 3/2015 | Blonder | |
| 9,144,258 | B2 | 9/2015 | Krivanek et al. | |
| 10,364,408 | B1 | 7/2019 | Nguyen | |
| 2005/0281869 | A1 * | 12/2005 | Kruse | A61K 8/345 424/195.17 |
| 2007/0173555 | A1 | 7/2007 | Loo | |
| 2007/0231508 | A1 | 10/2007 | Fand et al. | |

FOREIGN PATENT DOCUMENTS

| | | | |
|---|---|---|---|
| CN | 1183862 | 1/2005 | |
| CN | 110713587 | 1/2020 | |
| GB | 02897 | 2/1909 | |
| GB | 07007 | 3/1912 | |
| GB | 406893 | 3/1934 | |
| GB | 808426 | 9/1955 | |
| GB | 852743 | 11/1960 | |
| JP | H0638693 A * | 7/1992 | |
| JP | 638693 | 2/1994 | |
| KR | 101940990 | 1/2019 | |
| WO | 2013113086 | 8/2013 | |
| WO | WO-2013113086 A1 * | 8/2013 | ........... A23L 1/0532 |

OTHER PUBLICATIONS

"Effect of Evaporation on the Concentration of a Saturated Solution." Chemistry Stack Exchange, chemistry.stackexchange.com/questions/57683/effect-of-evaporation-on-the-concentration-of-a-saturated-solution. Dec. 18, 2016 (Year: 2016).*

JPH-0,638,693 (Satou) Jul. 1992 (online machine translation), [Retrieved on Jan. 30, 2024]. (Year: 1992).*

WO-2013113086 (Yara) Feb. 2013 (online machine translation), [Retrieved on Jan. 30, 2024]. (Year: 2013).*

Alex Warneke. "You Had Me at Seaweed-based Glitter Deep Sea News."Deep Sea News All the News on the Earth's Largest Environment., Feb. 27, 2017,deepseanews.com/2017/02/you-had-me-at-seaweed-based-glitter Retrieved on [Jan. 30, 2024]. (Year: 2017).* https://naturelab.risd.edu/discover/biomaterials-you-can-make-at-home/ (May 2024) (Year: 2024).*

Delgado https://class.textile-academy.org/2020/carolina.delgado/assignments/week06/ (Year: 2020).*

Cox—https://class.textile-academy.org/2024/riley-cox/assignments/week06/ (Year: 2024).*

Bogers, Loes, Agar Foil—Looes Bogers, Mar. 24, 2020 class.textile-academy.org/2020/loes.bogers/files/recipes/agarfoil (Year: 2020).

Unknown, "Effect of Evaporation on the Concentration of a Saturated Solution," Chemistry Stack Exchange, chemistry.stackexchange.com/questions/57683/effect-of-evaporation-on-the-concentration-of-a-saturated-solution. Dec. 18, 2016, 1 page.

Warneke, Alex, "You Had Me at Seaweed-based Glitter," Deep Sea News, Feb. 26, 2017, 1 page.

Delgado, Carolina, "Biofabricating Materials," ByLessPluss, 2019.

Unknown, "The Influence of Particles on Suspension Rheology" Anton Paar, Mar. 2017.

Olivé, Agnès Costa, "Biomaterials—Ways to Sort Them Out" Gitlab, 2019, 26 pages.

Contributors to Wikimedia projects, "Mica" Wikipedia, Mar. 21, 2020.

"Slurry" Wikipedia, Jan. 30, 2020.

* cited by examiner

FIG. 41

Agar Solid

-Ingredients
Agar-agar: Glycerin: Water = 2:1:30 by weight
Mica Powder: Adjustable, normally 1/40 of agar-agar by weight
-Directions
1. Mix agar-agar, glycerin, hot water in a pot, stir until all mixed evenly.
2. Cook over Medium-high heat. Stir occasionally. Bring to a boil.
3. Add mica powder for coloring. Keep boiling for 2 more minutes.

Agar Foam

-Ingredients
Agar-agar: Glycerin: Water = 2:1:30 by weight
Soap: 1 ml per 6 gram Agar
Mica Powder: Adjustable, normally 1/40 of agar-agar by weight
-Directions
1. Mix agar-agar, glycerin, hot water in a pot, stir until all mixed evenly.
2. Cook over Medium-high heat. Stir occasionally. Bring to a boil.
3. Add mica powder for coloring. Keep boiling for 2 more minutes.
4. Turn off the heat. Add soap and stir fast until the solution foamed evenly.

Shimmery Agar Foam

-Ingredients
Agar-agar: Glycerin: Water = 2:1:30 by weight
Shredded wool: 1/2 of agar-agar by weight
Soap: 1 ml per 6 gram Agar
-Directions
1. Mix agar-agar, glycerin, hot water in a pot, stir until all mixed evenly.
2. Cook over Medium-high heat. Stir occasionally. Bring to a boil.
3. Add wool and stir even. Keep boiling for 2 more minutes.
4. Turn off the heat. Add soap and stir fast until the solution foamed evenly.

22

FIG. 47
Free Dry
-Place on a flat surface.
-Parts dry freely.
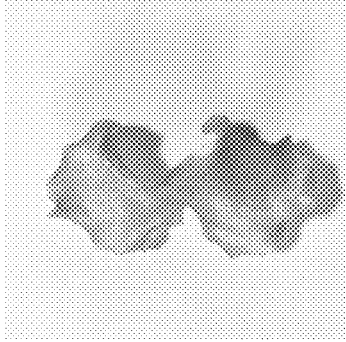
Light-press Dry
-Place on a flat surface, cover with jute netting.
-Parts dry flattier than Free Dry ones.
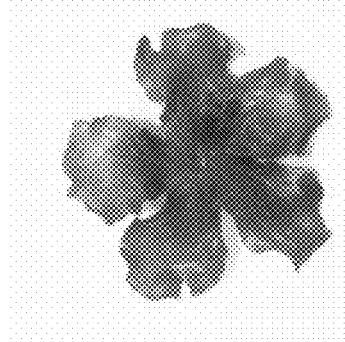
Stretch Dry
-Attach on smooth surface and create suction between material and the surface.
-Suction helps parts stay on the surface and dry flatly.
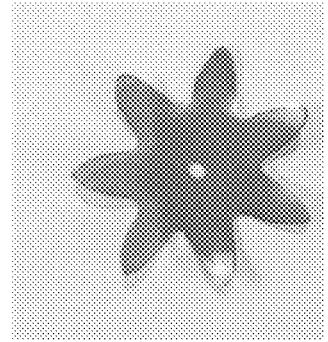

FIG. 48

High-temp. Dry
- Cast in preheat metal mold (100°C / 212°F)
- High temperature evaporates certain amount of moisture immediately, creating shinier, stiffer texture.

Freeze Dry
- Put in freezer for 1 hour minimum.
- Freezing seperate water from agar, creating airy and pearlish texture after fully dried.
- Freezing only structurally seperate water from agar. It still need air dry after removing from the freezer, but it usually takes less time.

Hang Dry
- Attach only one point of the part to various supports, usually a stick or a rod by hanging.
- The suspended part can dry more sculpturally in the air.

Tension Dry
- Prepare one fully dried part, and coat the part with fresh boiled agar-agar on one side.
- Place the coated part on a flat surface after the coat is solidified.
- Let dry on a flat surface. The part will curl in certain direction due to different tension on each side.

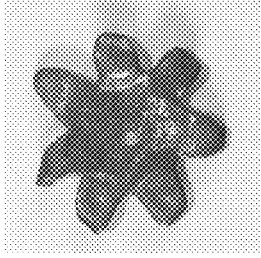 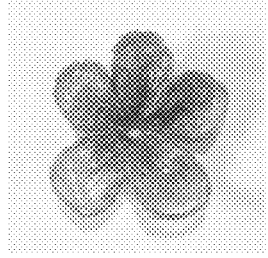 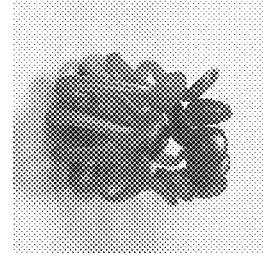 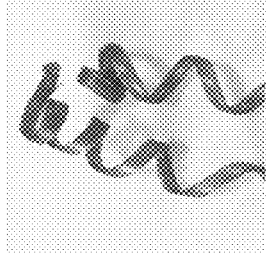

FIG. 50

High-temp. Dry
- Cast in preheat metal mold (100°C/212°F)
- High temperature evaporates certain amount of moisture immediately, creating shinier, stiffer texture.

Freeze Dry
- Put in freezer for 1 hour minimun.
- Freezing seperate water from agar, creating airy and pearlish texture after fully dried.
- Freezing only structurally seperate water from agar. it still need air dry after removing from the freezer, but it usually takes less time.

Hang Dry
- Attach only one point of the part to various supports, usually a stick or a rod by hanging.
- The suspended part can dry more sculpturally in the air.

Tension Dry
- Prepare one fully dried part, and coat the part with fresh boiled agar-agar on one side.
- Place the coated part on a flat surface after the coat is solidified.
- Let dry on a flat surface. The part will curl in certain direction due to different tension on each side.

ARTIFICIAL BOTANICALS AND METHODS OF MAKING SAME

CROSS-REFERENCE TO RELATED APPLICATIONS

This patent application is a divisional of U.S. patent application Ser. No. 17/219,987 filed Apr. 1, 2021 and since issued as U.S. Pat. No. 11,872,727, which claims domestic benefit of U.S. Provisional Application No. 63/006,112 filed Apr. 7, 2020, with both patent applications incorporated herein by reference in their entireties.

BACKGROUND

Artificial plants, trees, and flowers have many advantages and many disadvantages. As the reader likely understands, man-made or "fake" botanicals require no nurturing, water, nor nutrients. Botanical reproductions are durable and have a very long life cycle, perhaps measured in years. Faux botanicals may also remain colorful and vibrant-looking year-round. Artificial botanicals, however, often lack realism and fail to mimic nature's true hues and botanical details. Artificial botanicals are conventionally made from plastics, silks, and/or fabrics, which may be environmentally harmful and wasteful. While artificial botanicals are often less expensive, the best, realistic offerings (such as silk flowers) are often more expensive than natural plantings and cuttings.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 41-43 illustrate recipes using the solidified, agar-based mixture, according to exemplary embodiments;

FIGS. 47-48 illustrate different dehumidification techniques, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, ingredients, and/or components, but do not preclude the presence or addition of one or more other features, integers, steps, operations, elements, ingredients, and/or groups thereof. As used herein, the term "and/or" includes any and all combinations of one or more of the associated listed items.

Figure 1:
FIGS. 1-2 illustrate an artificial botanical and a process or method for manufacturing the artificial botanical, according to exemplary embodiments.
Figure 2:
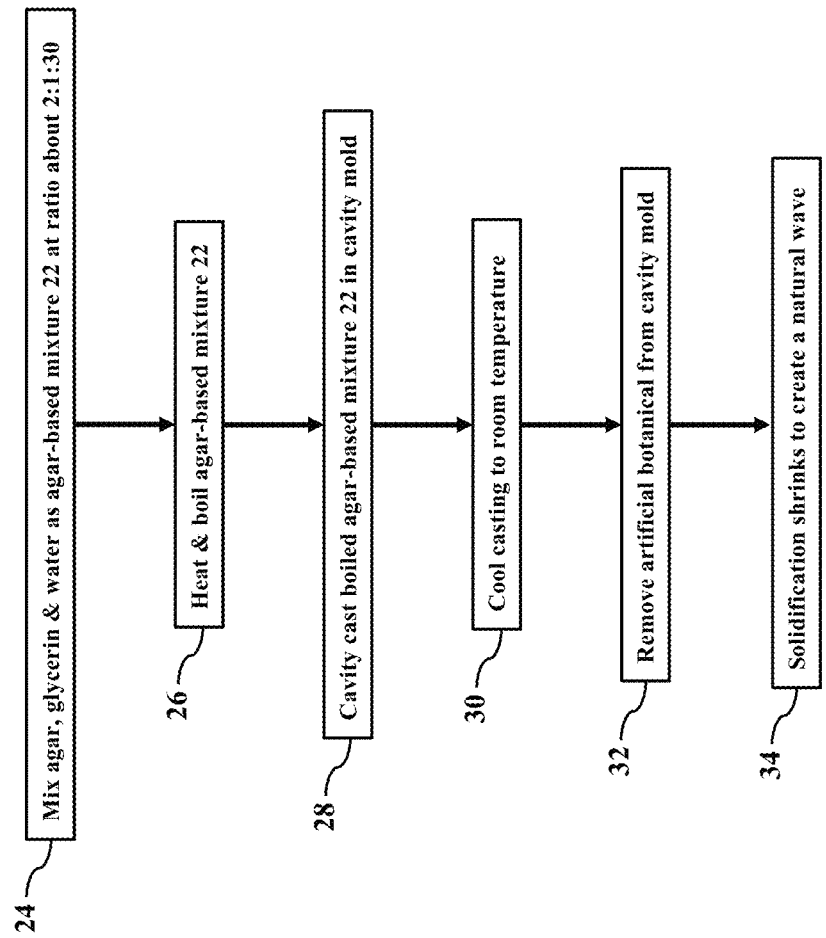
Figure 3:
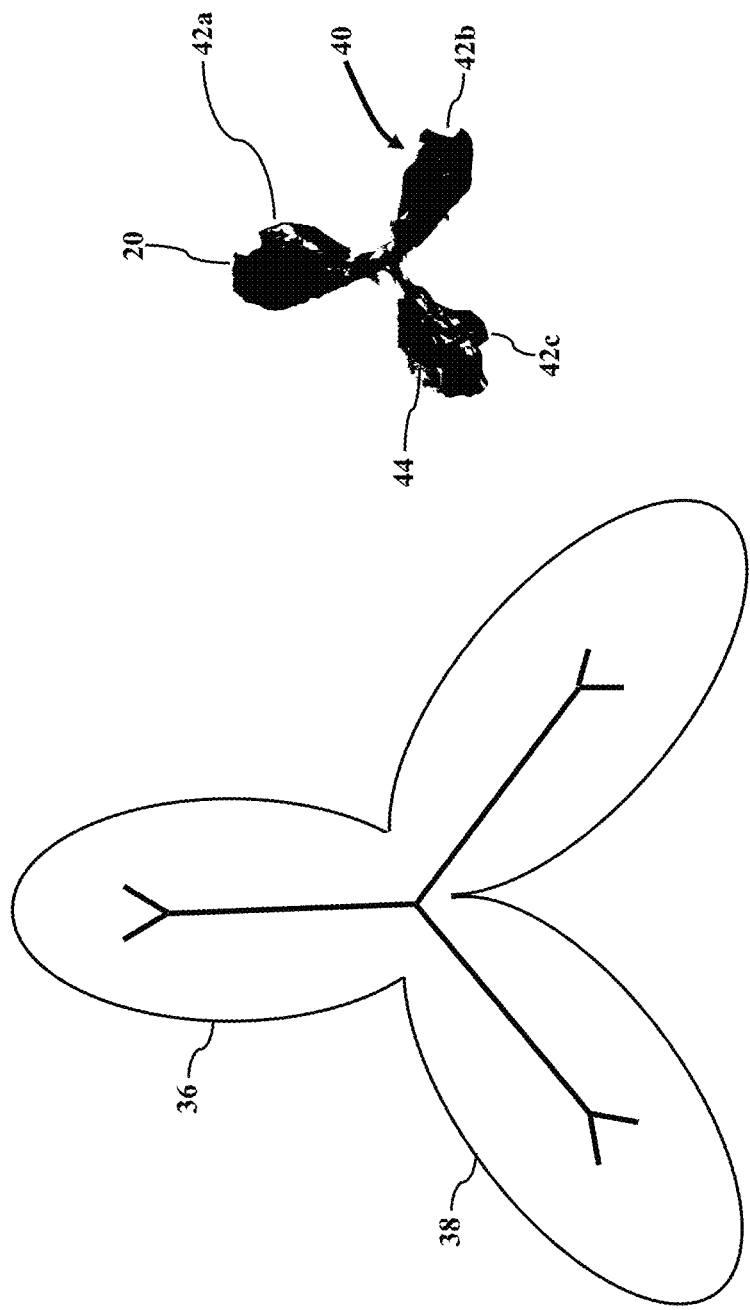
FIGS. 3-14 illustrate sculpting of the artificial botanical made according to the process, recipe, and method illustrated in FIG. 2, according to exemplary embodiments.
Figure 4:
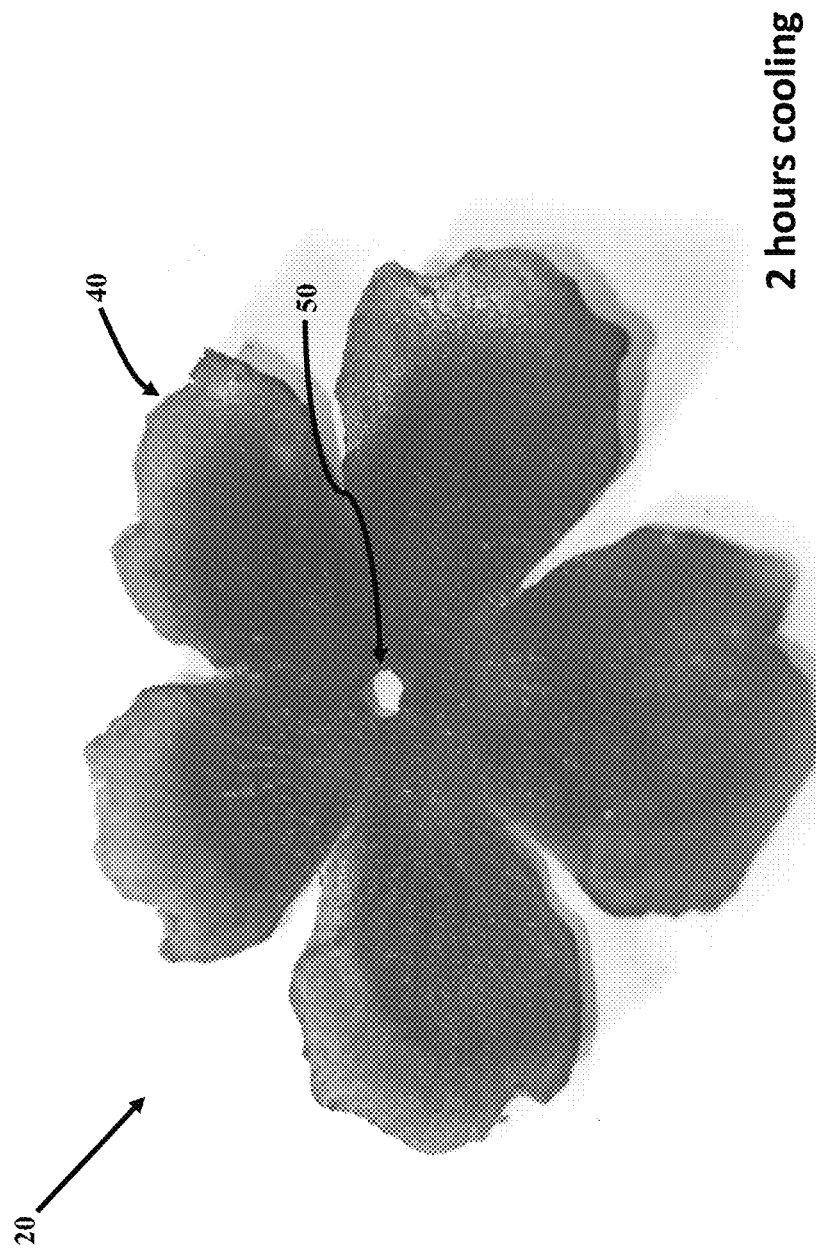
Figure 5:
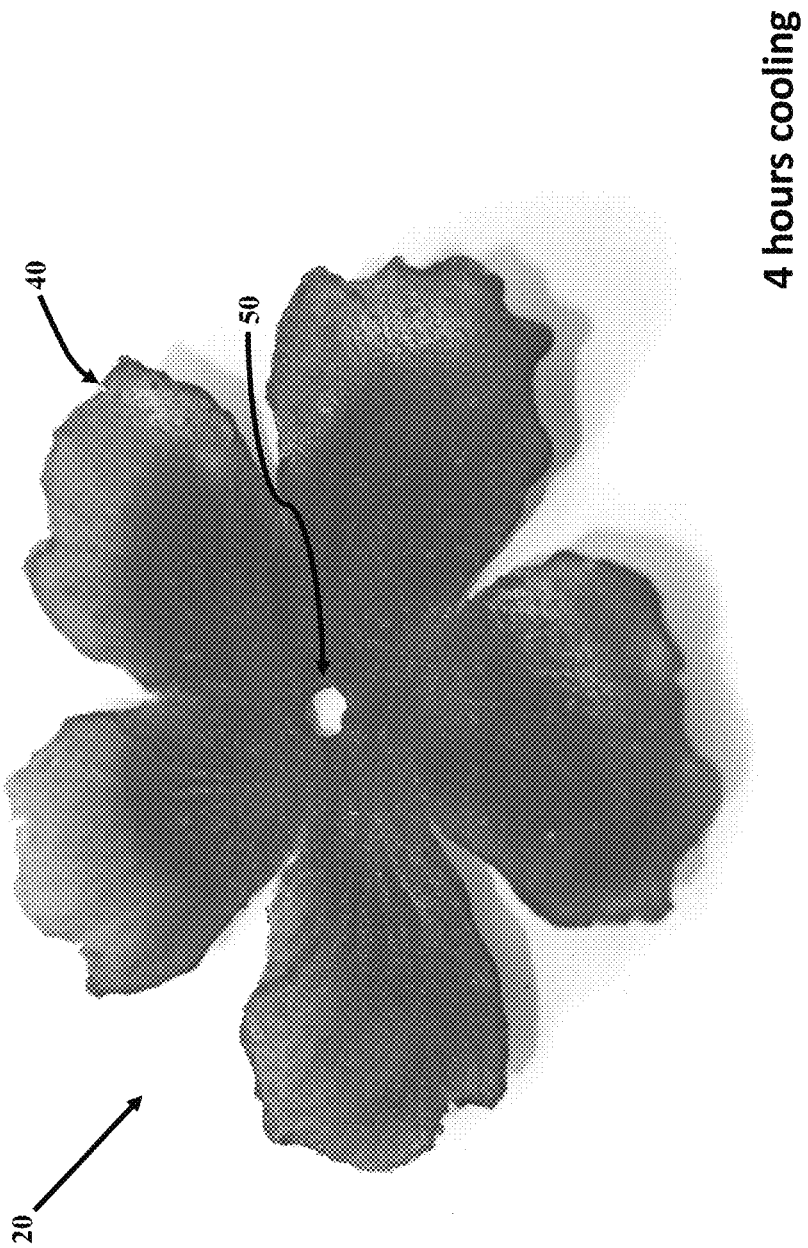
Figure 6:
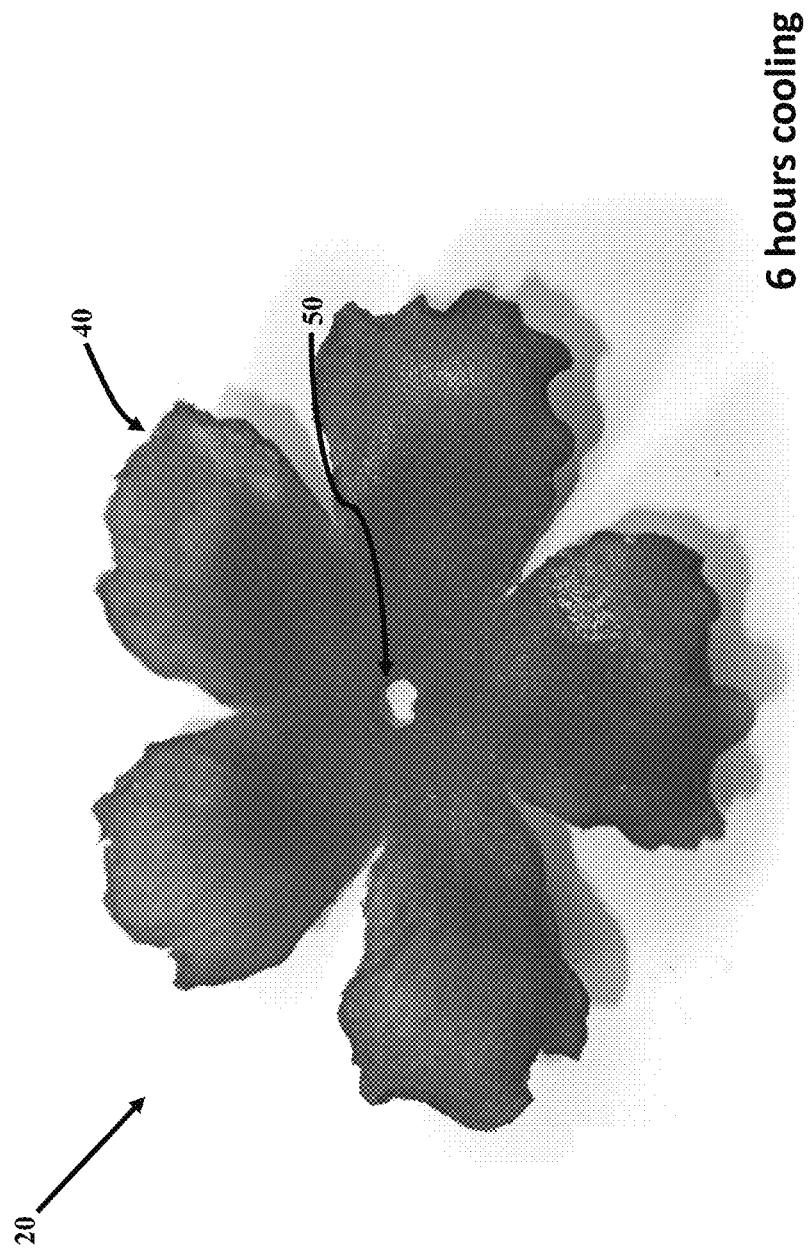
Figure 7:
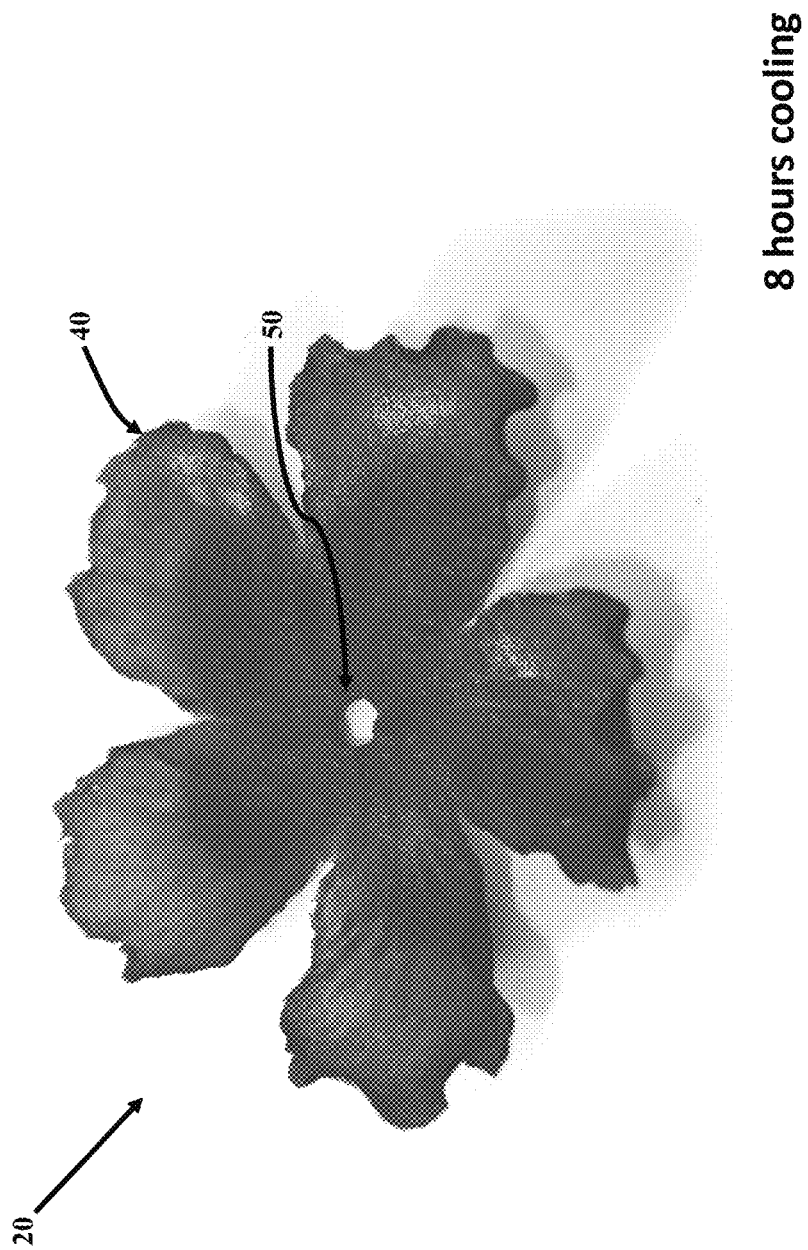
Figure 8:
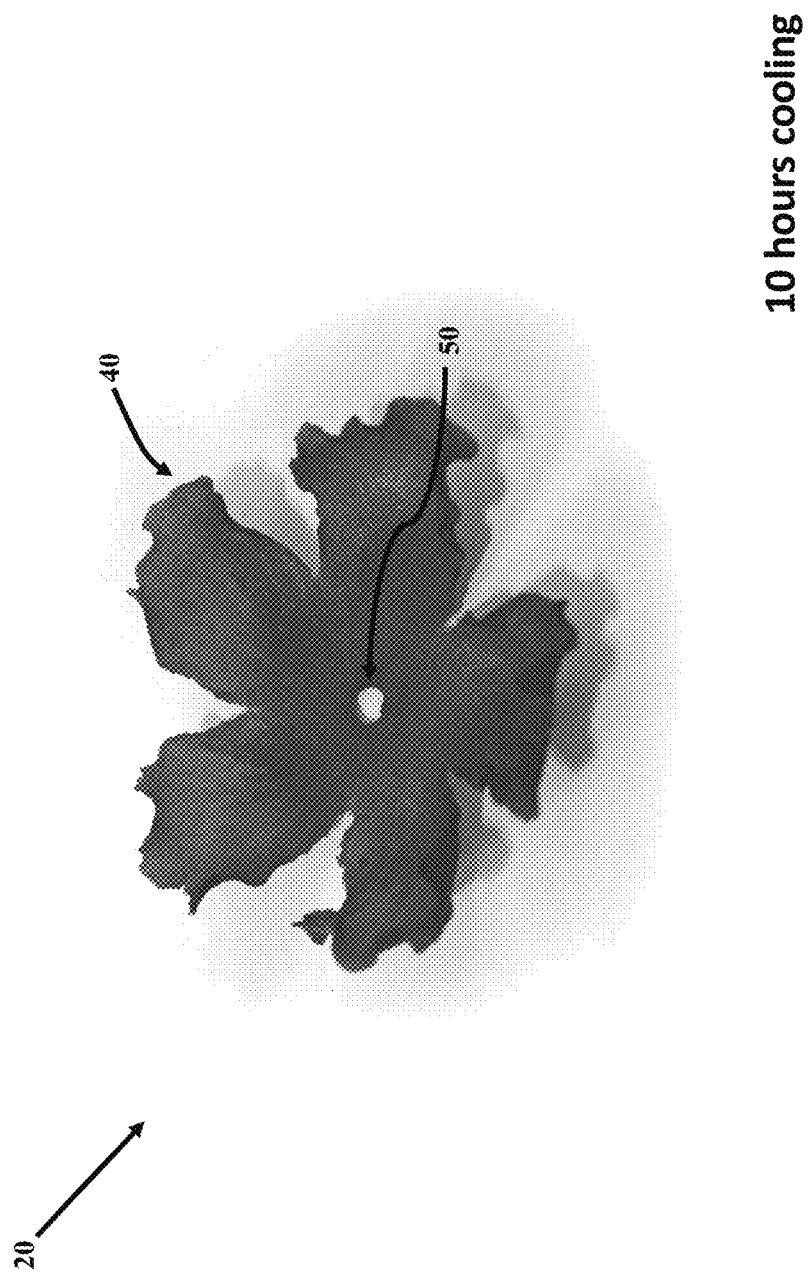
Figure 9:
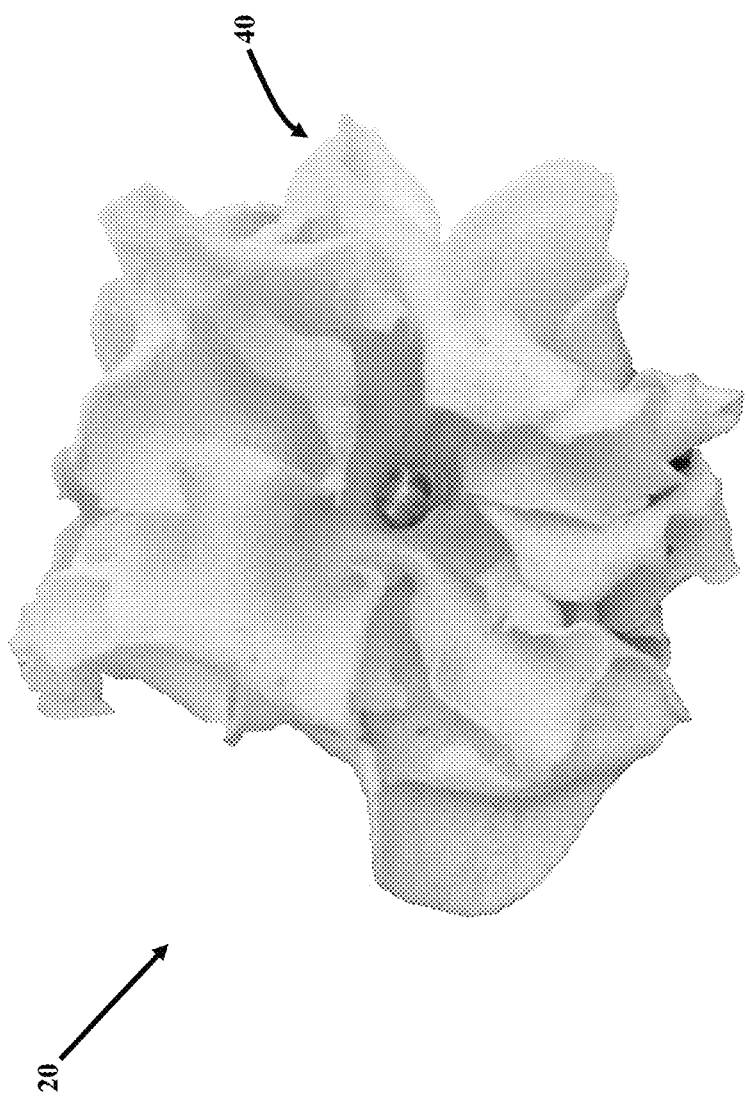
Figure 10:
Figure 11:
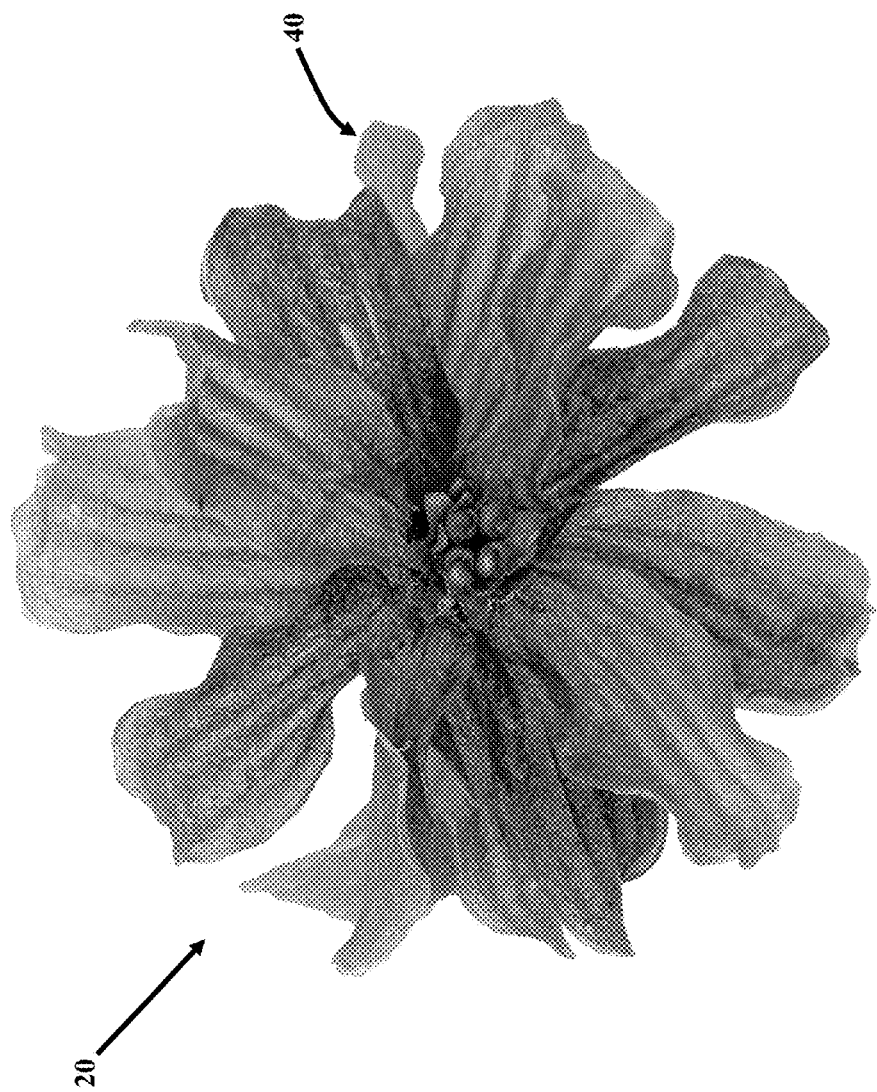
Figure 12:
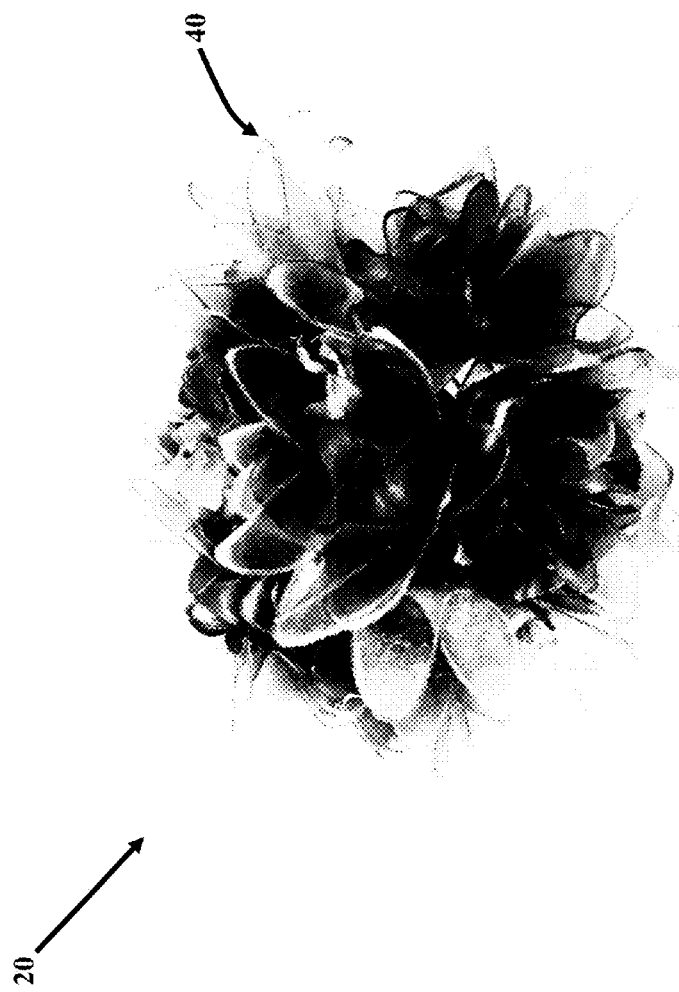
Figure 13:
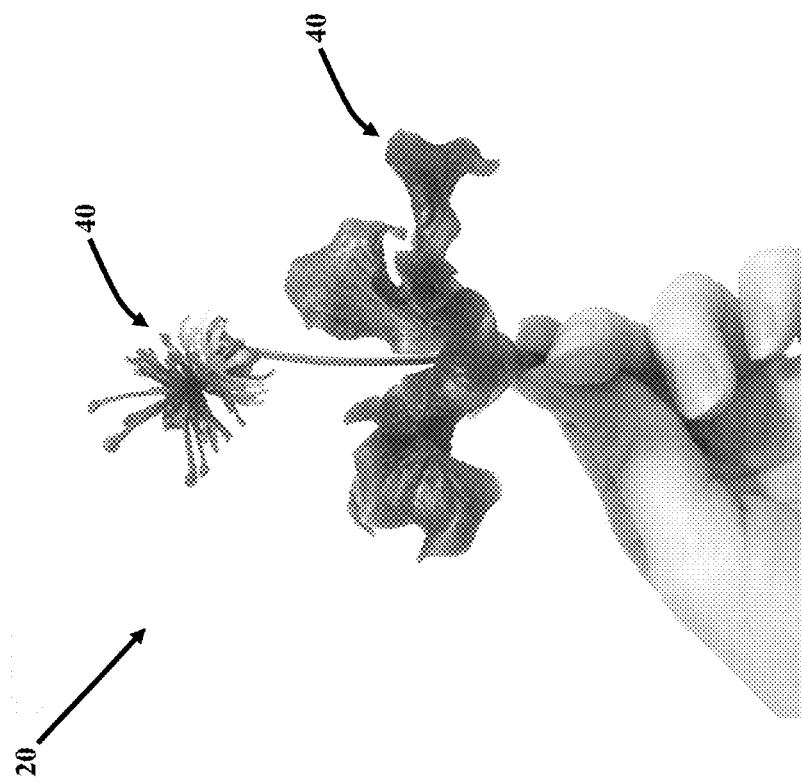
Figure 14:
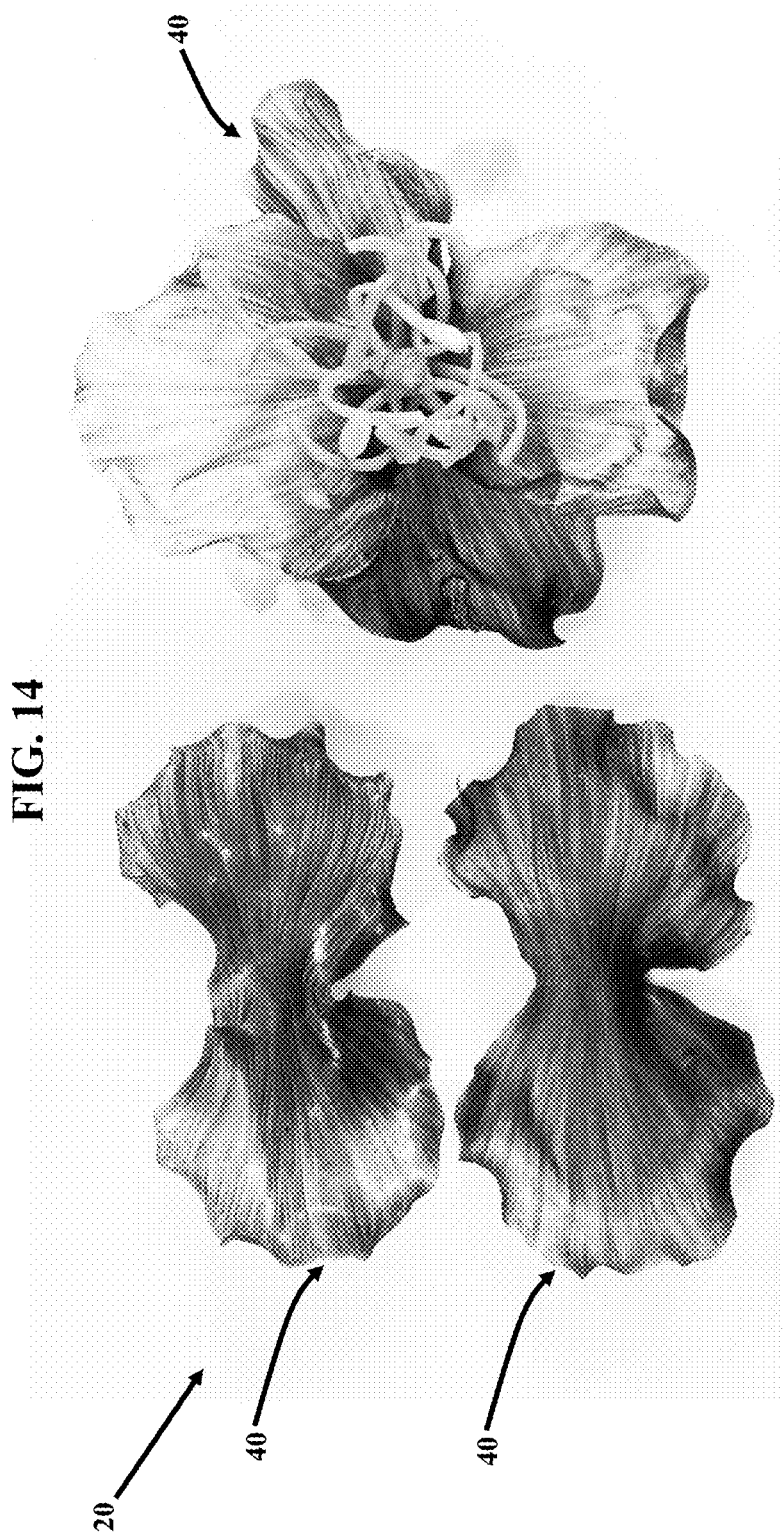
Figure 15:
FIGS. 15, 16, & 17 illustrate colorants, according to exemplary embodiments.

FIGS. 1-2 illustrate an artificial botanical 20 and a process or method for manufacturing the artificial botanical 20, according to exemplary embodiments. While the artificial botanical 20 may be any faux or fake tree or plant, most readers are generally familiar with artificial flowers. Conventional artificial flowers, though, are usually made from polymer-based plastics having environmental concerns. As FIG. 2 illustrates, though, the artificial botanical 20 is produced or manufactured using an aqueous, agar-based mixture 22. Agar, glycerin, and water are combined (Block 24) as ingredients and stirred/mixed to produce the agar-based mixture 22. The agar-based mixture 22 mixes the agar, the glycerin, and the water at a 2:1:30 ratio by weight (grams). The agar-based mixture 22 may then be heated and stirred/mixed (Block 26) to a boiling temperature (such as 212° F.). As the agar-based mixture 22, a portion of the water vaporizes away and increases a concentration of the agar and/or glycerin. The heated/boiled agar-based mixture 22 may then be cavity casted (Block 28) by pouring the boiled/boiling agar-based mixture in a three-dimensional (3D) mold cavity. The mold cavity is machined, stamped, forged, milled, printed, or otherwise fabricated and shaped as desired (such as petaled, flower shaped cavity mold corresponding to or resembling an artificial flower). The agar-based mixture 22 is then cooled (Block 30) in the mold cavity to a desired temperature (perhaps to near or about ambient or room temperature). As the agar-based mixture 22 cools in the mold cavity, the agar-based mixture 22 begins solidification, drying, dehydrating, and dehumidification. The artificial botanical 20 is removed from the mold cavity (Block 32). After removal, the prototypes were laid aside for drying, such as on any porous surface (wood board, fabric material, jute mesh, or metal rack for better air circulation). As the artificial botanical 20 continues drying, the artificial botanical 20 hardens and shrinks to create a natural wave in an edge periphery (Block 34).

The shrinkage and sculpting improve the artificial botanical 20. As the agar-based mixture cools, dehydrates/dehumidifies, and hardens, shrinkage onsets. Once the artificial botanical 20 is removed from the cavity mold and continues drying, the shrinkage produces the random, natural wave 40 in the artificial petals 42a-c and along the edge periphery 44. The natural wave 40 mimics natural forms found in nature.

The natural wave 40 thus improves a realistic, natural appearance without additional molding, machining, processing, or forming operations and without their associated time and costs. The process or method illustrated in FIG. 2 thus produces the artificial botanical 20 in less time, with less cost, and with more realistic, natural aspects.

FIGS. 3-14 illustrate sculpting of the artificial botanical 20 made according to the process or method illustrated in FIG. 2, according to exemplary embodiments. The artificial botanical 20 was cavity casted by pouring the boiled/boiling agar-based mixture 22 over, onto, and/or into the mold cavity 36. Here the mold cavity 36 is constructed to resemble a three-petaled flower 38, including fine, intricate natural details (such as midrib and veins). In the drying process, the agar-based mixture cools, solidifies, and progressively shrinks, resulting in the artificial botanical 20 having about one fourth (¼) the size of the mold cavity 36. The shrinkage produces the random, natural wave 40 in the artificial botanicals 20. FIGS. 4-8 are progressive illustrations of the shrinkage that occurs over cooling and drying time that produces the random, natural wave 40. As the artificial botanical 20 dehydrates, the petals 42 (with their natural-looking pistils, stamens, and other cast features) will progressively form in three-dimensions. The artificial botanical 20 may further be molded, drilled, cut, punched, or perforated to form a generally central hole or bore 50. A fastener (pin, rivet, screw/nut, or clamp) may thus be inserted into and through the bore 50 to secure an assemblage of multiple artificial botanicals 20. As FIGS. 9-14 illustrates, different artificial botanicals 20 may be stacked or layered together with unique and very natural-looking features. As FIGS. 1-14 illustrate, the artificial botanicals 20 made according to the process or method illustrated in FIG. 2 may have any number of the petals that mimic any natural species. Moreover, more intricate designs may be formed by combining or assembling different, solidified designs of multiple layers. The shrinkage-induced natural wave 40 produces a realistic, natural appearance without added time and costs for additional operations.

The aqueous, agar-based mixture 22 is an all-natural, organic, plant-based substance. The agar is a vegetarian gelatin and is obtained from seaweed or algae and contains linear polysaccharide agarose and agaropectin. The algae are known as agarophytes (Rhodophyta (or red algac) phylum). The agar melts at 85° C. (185° F.) and begins solidifying at 104° F.). Animal-based gelatins melt at much lower temperatures (such as 98° F. or 37° C.—human body temperatures) and are thus unsuited for artificial botanicals 20, jewelry, and other articles that melt when worn by humans. Animal-based gelatins may also have an offensive odor, especially at human body temperatures. The agar is white, semi-translucent, and is available in flake, powder, bar, and strand form. Because the agar, glycerin, and water are combined at a 2:1:30 ratio by weight (grams), this agar-based mixture 22 may be herein referred to as a moldable, biodegradable, natural, and renewable bio-plastic material.

The glycerin is a carbohydrate. The glycerin is a sugar alcohol or polyol. The glycerin is a glycerol or three-carbon backbone of a triglyceride. The glycerin naturally formed through alcoholic fermentation of sugars. The glycerin helps retain moisture, prevents sugar crystallization, and adds sweetness and texture.

Water is conserved. The aqueous, agar-based mixture 22 mixes the agar, the glycerin, and the water at a 2:1:30 ratio by weight (grams). In other words, one (1) gram of agar is mixed with fifteen (15) grams of water. While agar and water have been mixed for culinary uses (such as edible desserts), these culinary uses have used much more water at a ratio of about 1:50. The aqueous, agar-based mixture 22 thus uses much less water than conventional culinary uses. The artificial botanical 20 is far more environmentally conscious and consumes sustainable seaweed/algae.

In-mold drying is optional. Prototype artificial flowers were permitted to cool and harden in the cavity mold 36. However, the inventor observed that the agar-based mixture 22 may stick or adhere to the cavity mold 36 during hardening. This mold stickage or adherence inhibited the material shrinkage that produces the natural wave 40 in the artificial petals 42a-c (illustrated in FIG. 3). The inventor thus observed that the prototype artificial flowers were best removed from the cavity mold 36 for drying, as natural realism was improved with a smooth, flat, and even outcome. However, when the agar-based mixture 22 was used to produce prototype, agar-based sheets, yarns, and ropes (as this disclosure will later discuss), in-mold drying yielded adequate results.

Figure 16:
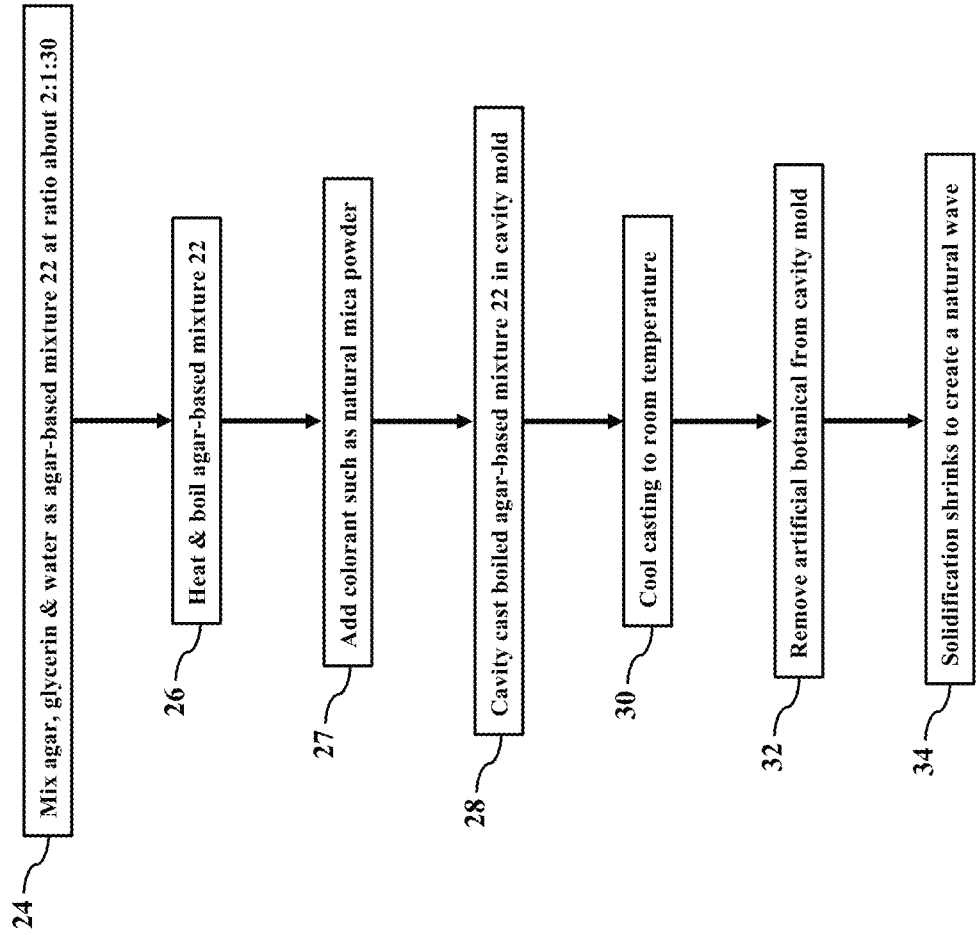

FIGS. 15, 16, & 17A-C illustrate colorants 60, according to exemplary embodiments. Because the aqueous, agar-based mixture 22 may be creamy, yellowish, or brownish in color and semi-translucent, one or more of the colorants 60 may be added as desired for further realism, style, and/or for effect. The colorant 60 may include any food dye, pigment powders, and even oil-based or water-based paints. However, because the aqueous, agar-based mixture 22 is an all-natural substance, the colorant 60 is preferably mica. The mica is natural stone mineral. The mica has thin crystalline plates that reflect/refract visible light to create a shimmer, glitter, or frost effect. As FIG. 16 illustrates, the mica may be added as a powder to the heated/boiled agar-based mixture 22 (Block 27). While the mica may be added in any amount, numerous artificial botanicals 20 have been prototyped using about a 1:40 ratio by weight (grams) of the mica powder to the agar. More or less of the mica powder may be used to produce the desired coloring effect. The colored, boiled agar-based mixture 22 may then be cavity casted (Block 28), cooled (Block 30), and removed (Block 32). Further drying produces the natural wave (Block 34).

Multiple colored batches may be nearly simultaneously prepared. Two different colored agar-based mixtures 22 may be prepared and poured into/onto the same cavity mold 36. As the two different colored agar-based mixtures 22 flow over and into the cavity mold 36, the two different colored agar-based mixtures 22 will mix/merge together. As the two different colored agar-based mixtures 22 cool and solidify, their combined pleasing, colorful effects harden.

Mica-surfacing may also be used. The colorant 60 (such as the mica powder) may be brushed or dusted onto an inner surface of cavity mold 36. After the cavity mold 36 is at least partially coated with the mica powder, the boiled/boiling agar-based mixture 22 may be poured into/onto the mold cavity 36. As the agar-based mixture 22 cools, the mica powder remains suspended within a thin, outer region of the artificial botanical 20. When the artificial botanical 20 is pulled from the cavity mold 36, the outer, exterior surface of the solidified artificial botanical 20 thus has a thin coating of the mica powder for a shimmery, glittery, or frosty effect.

Figure 17:
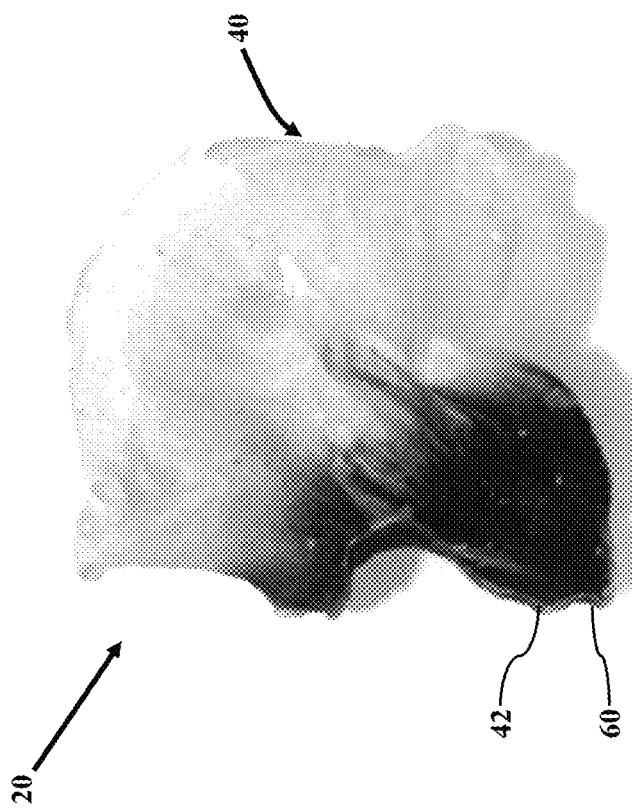

FIG. 17 illustrates different coloring techniques. FIG. 17, for example, illustrates a color soaking. After the artificial botanical 20 is removed from the cavity mold (illustrated as reference numeral 36 in FIG. 3), any part or region of the artificial botanical 20 may be post-soaked in the colorant 60. A tip portion of the petal 42, for example, may be dipped or immersed in a dye (such as an aqueous natural dye) for any time (such as 1 hour to many hours, depending on the desired effect). The coloring techniques may also include brush appliques, such as brushing the colorant 60 onto/into the cavity mold 36. During prototype manufacture, food dyes, paints, and many other colorants were brushed on the cavity mold 36, some with pattern or in parts to create different gradient effects. Unlike mica-surfacing, by brushing dyes and paints on the molds 36 before casting, the agar-based mixture 22 will fully absorb the colorant(s) 60. These brush appliques may result in similar realism, yet the artificial botanical 20 may be designed with more complex outcomes.

Figure 18:
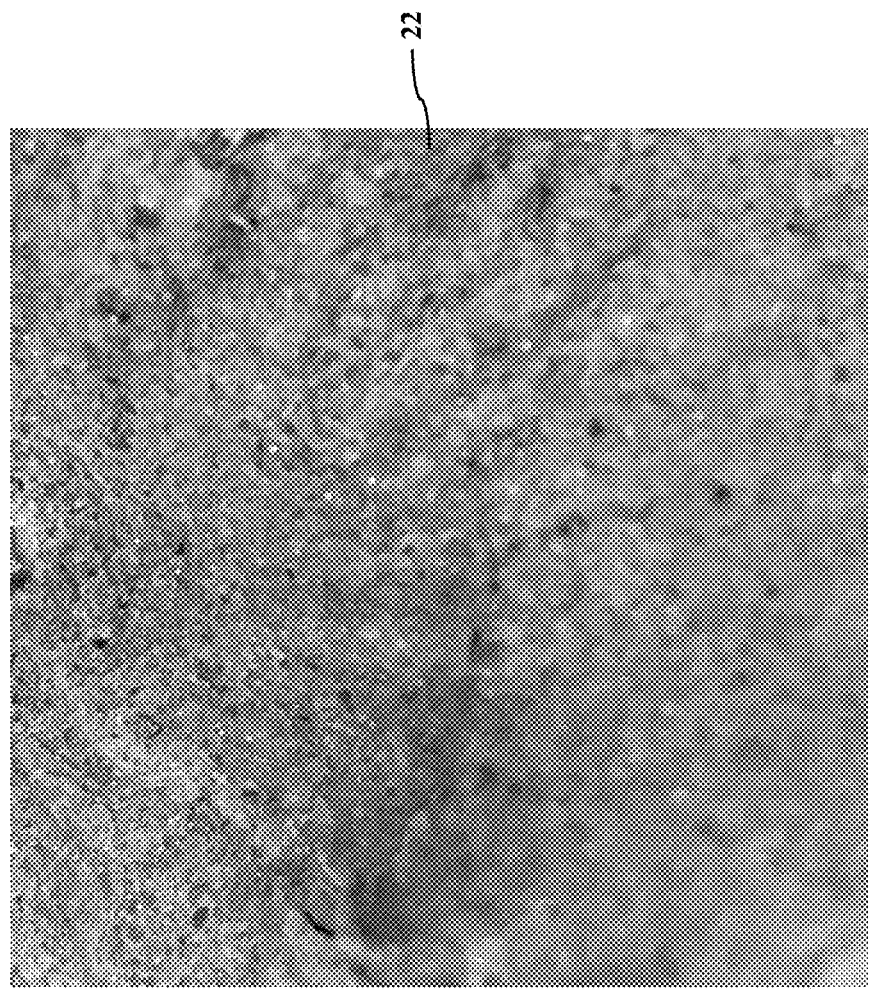
FIGS. 18-19 illustrate a soap additive, according to exemplary embodiments.
Figure 19:
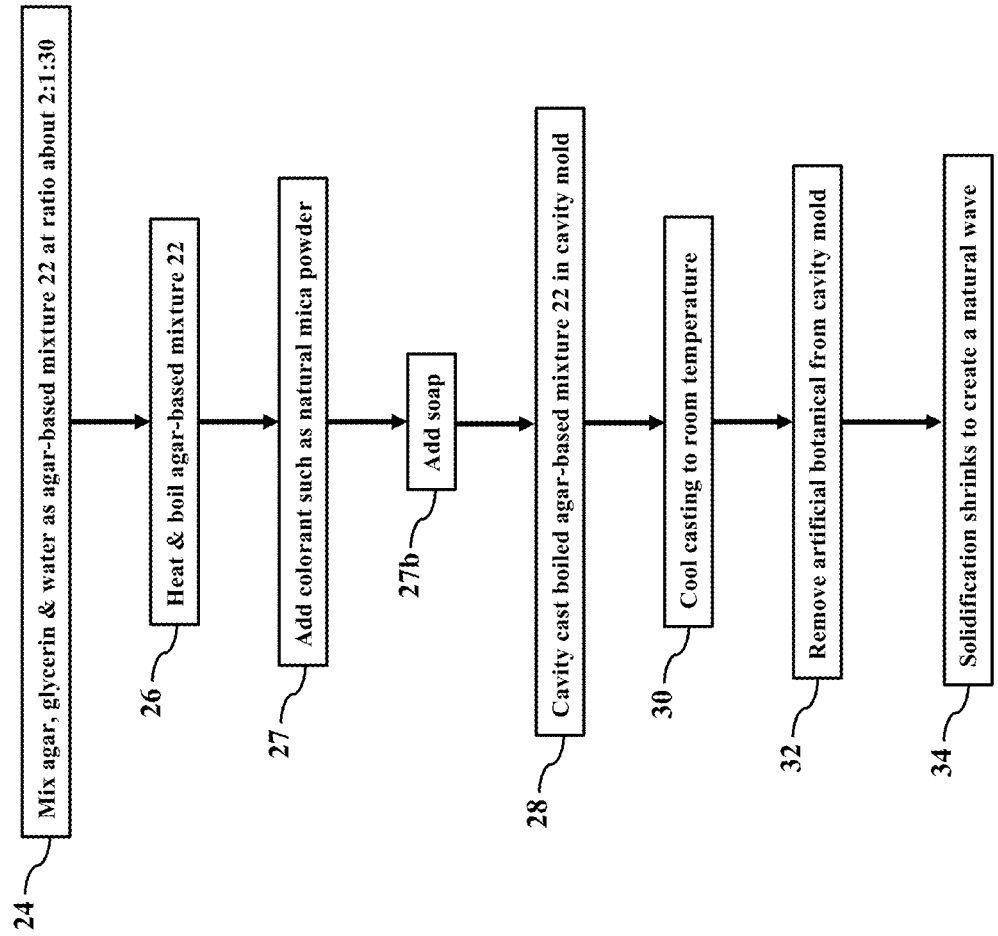

FIGS. 18-19 illustrate a soap additive, according to exemplary embodiments. Because the aqueous, agar-based mixture 22 is water-based, the addition of the soap additive (such as vegetable-based toilet soap) promotes the formation of soap bubbles within the agar-based mixture 22. As FIG. 18 illustrates, the agar-based mixture 22 may thus have a foamy upper layer, depending on the amount of the soap additive. As FIG. 19 illustrates, after the heated/boiled agar-based mixture 22 (Block 24) is prepared and colored (if desired), the soap additive is added (Block 27b). Hand or machine beating/mixing (perhaps 20-60 seconds or more) may ensure thorough dispersion. While the soap additive may be added in any amount, numerous artificial botanicals 20 have been prototyped using a ratio of about 1 milliliter of the soap additive to about 6 grams of the agar. The soap additive is preferably added after the heat is removed, and resulting soapy, agar-based mixture 22 is quickly stirred to an evenly-distributed foamy appearance. The soapy, agar-based mixture 22 is cavity casted (Block 28), cooled (Block 30), and removed (Block 32). Further drying produces the natural wave (Block 34).

Figure 20:
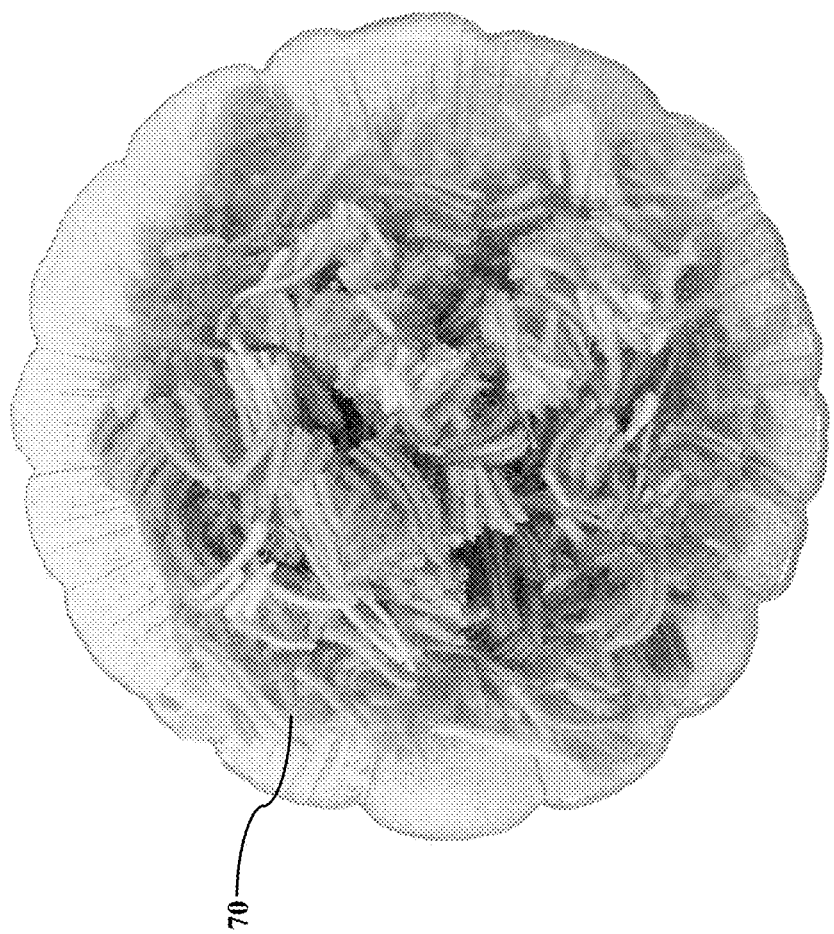
FIGS. 20-22 illustrate a wool additive, according to exemplary embodiments.
Figure 21:
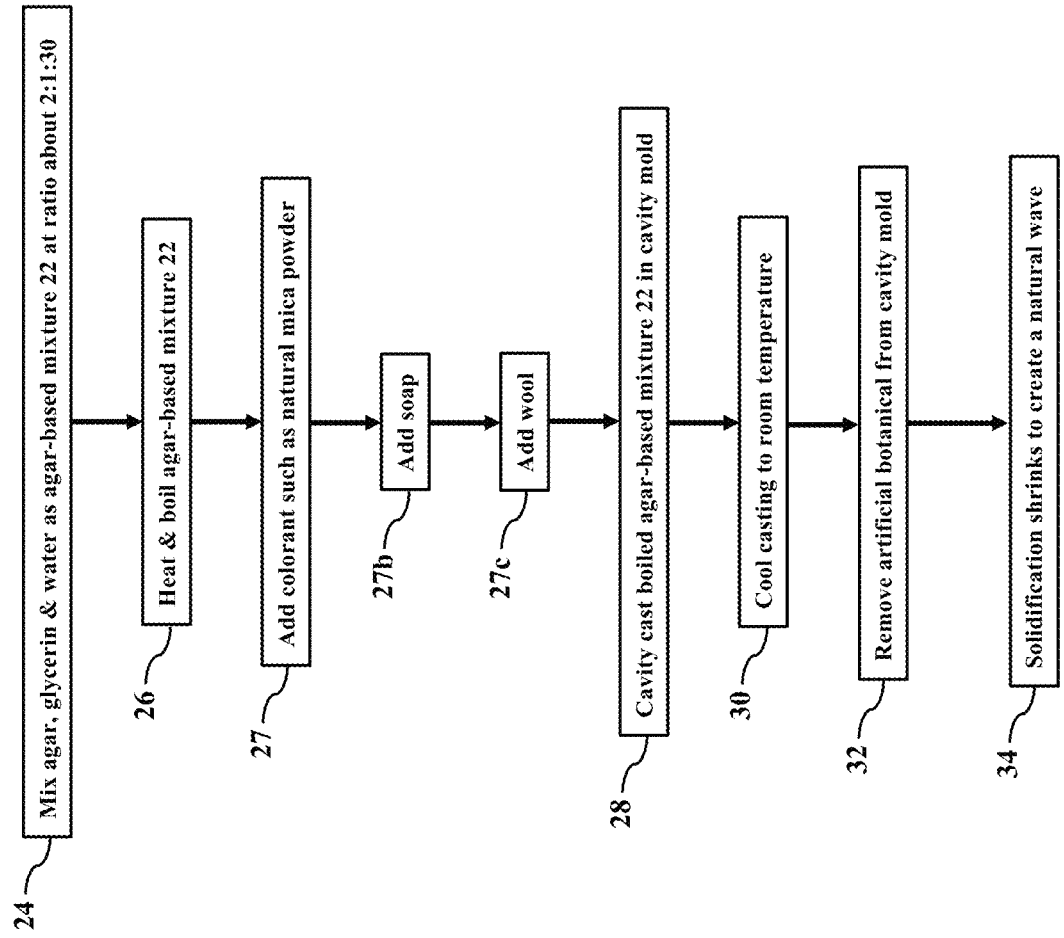
Figure 22:
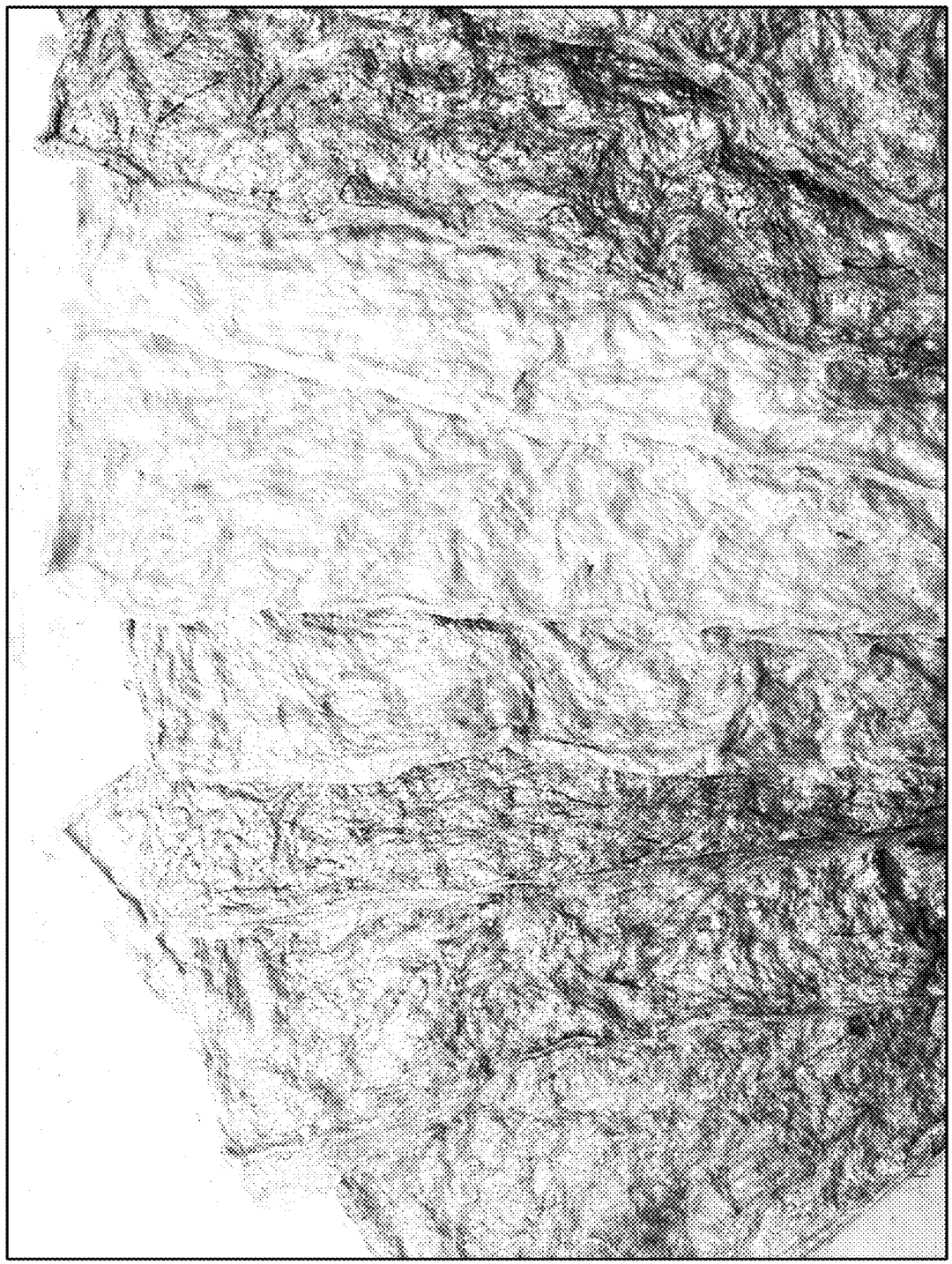

FIGS. 20-22 illustrate a wool additive 70, according to exemplary embodiments. FIG. 20 illustrates natural woolen fibers/shreds/snippets that may be added. Because the aqueous, agar-based mixture 22 is water-based, the wool additive 70 adds a surface texture, roughness, or topography for added realism, customization, and product differentiation. As FIG. 21 illustrates, after the agar-based mixture 22 is boiled (Block 26) and colored (if desired) (Block 27) and soaped (Block 27b), the soap wool fibers/shreds/snippets may be added and evenly stirred (Block 27c). The soapy, woolen agar-based mixture 22 is cavity casted (Block 28), cooled (Block 30), and removed (Block 32). Further drying produces the natural wave (Block 34). FIG. 22 illustrates various material samples of the hardened soapy, woolen, agar-based mixture 22.

Figure 23:
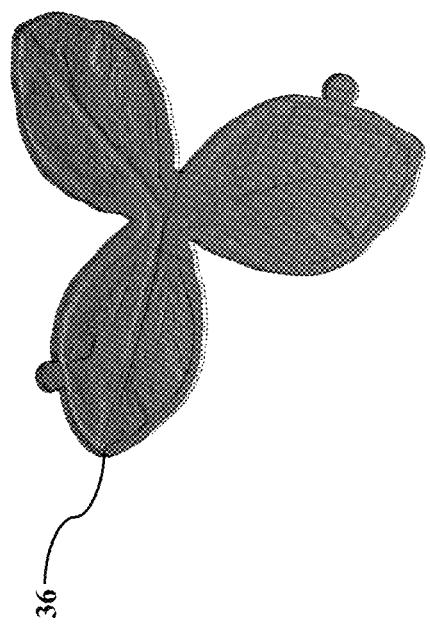
FIGS. 23-26 illustrate a cavity mold, according to exemplary embodiments.
Figure 24:
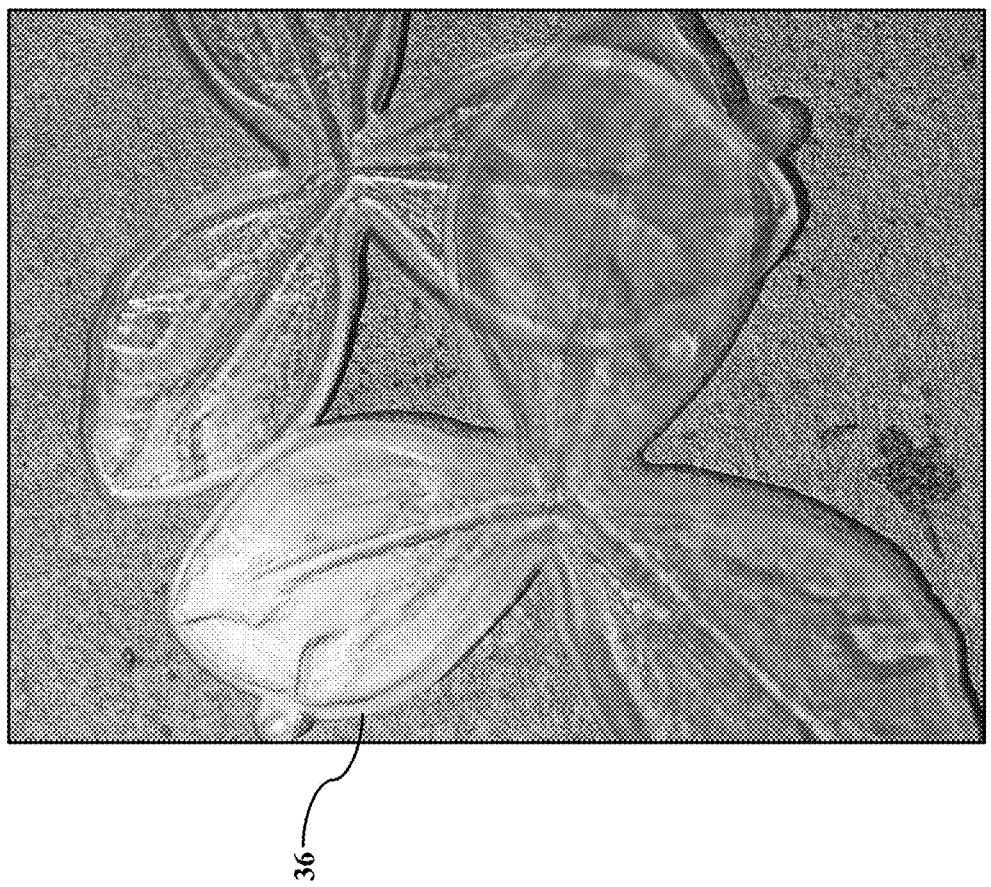
Figure 25:
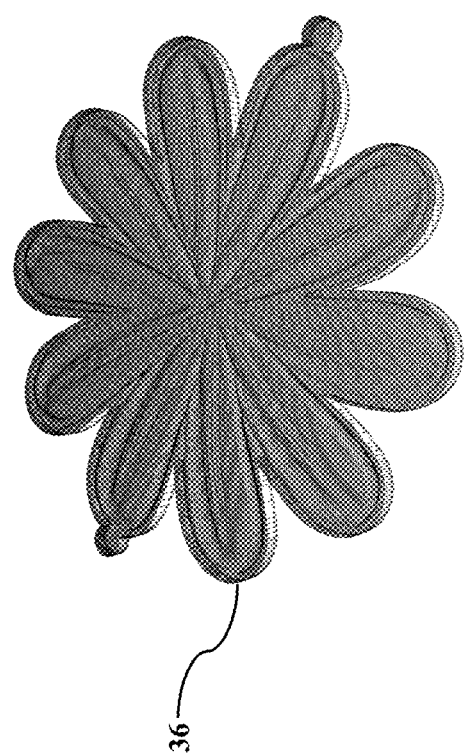
Figure 26:
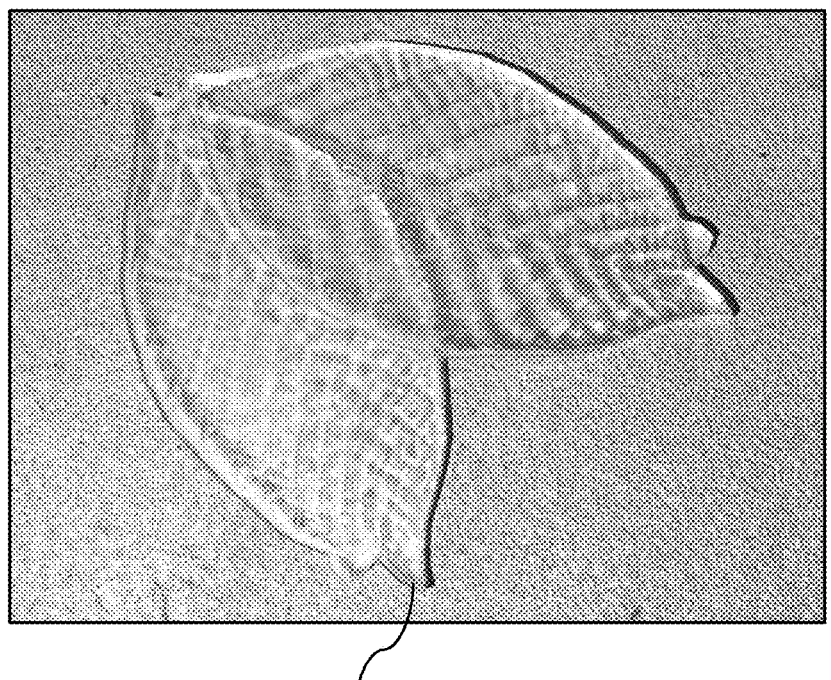

FIGS. 23-26 illustrate the cavity mold 36, according to exemplary embodiments. The cavity mold 36 is machined, tooled, milled, laser-engraved, stamped, or otherwise fabricated in a shape and thickness that resembles the desired artificial botanical 20. The cavity mold 36 may also be produced using stereolithography, additive manufacturing, or 3-D printing techniques as a smaller and less expensive CAD process. Because the cavity mold 36 is created, the cavity mold 36 may be fabricated to yield new species, new petal shapes, and/or different numbers of petals than those found in nature. FIG. 23 thus illustrates a CAD rendering of the cavity mold 36 (illustrated in FIG. 3), while FIG. 24 illustrates the 3-D printed cavity mold 36. FIG. 25 illustrates a wireframe rendering of the cavity mold 36 resembling a daisy. FIG. 26 illustrates another 3-D printed cavity mold 36a and a hand-carved cavity mold 36b. As FIG. 26 especially illustrates, the quality and/or realism of the cavity mold 36 greatly affects detailed petaling/leafing and thus the realism of the artificial botanical 20. As production quantities increase, tooling may be fabricated having multiple cavity molds 36 for efficient injection molding or extrusion techniques. Prototype cavity molds 36 have been fabricated using laser-cut acrylics, 3D printed using thermoplastic elastomers and polyurethanes, 3D printed using renewable polylactic acid, and 3D printed using flexible resins. Prototype cavity molds 36 have been fabricated by CNC milling of acrylic materials and of aluminum. Prototype cavity molds 36 have also been fabricated using ceramic materials. Ceramic cavity molds 36 are an optional high-temperature material for high-temperature castings, and ceramic cavity molds 36 may be more visually pleasing while performing the process (illustrated in FIGS. 2, 16, 19 & 21) in view of an audience/observer. Moreover, prototype rubber cavity molds have been carved by hand, which creates very nice and delicate linear venations which other CAD procedures can hardly achieve.

Figure 27:
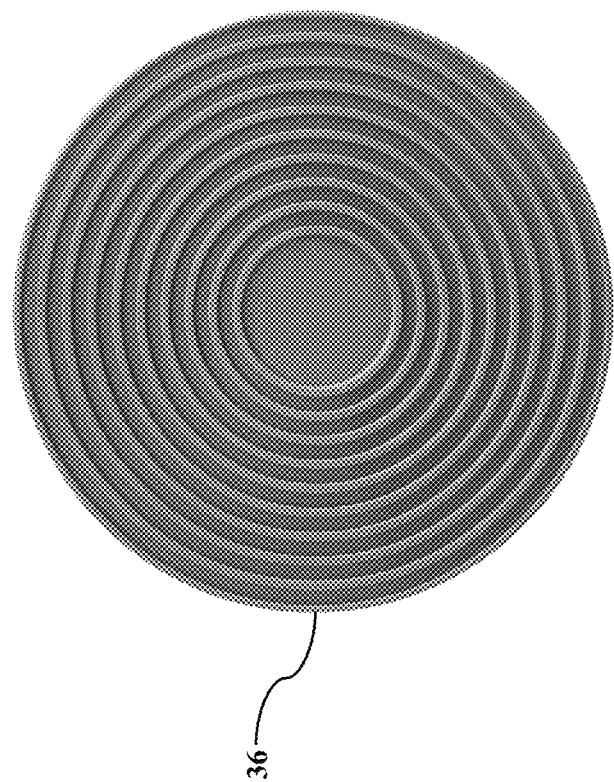
FIGS. 27-35 illustrate additional productions using a solidified, agar-based mixture, according to exemplary embodiments.
Figure 28:
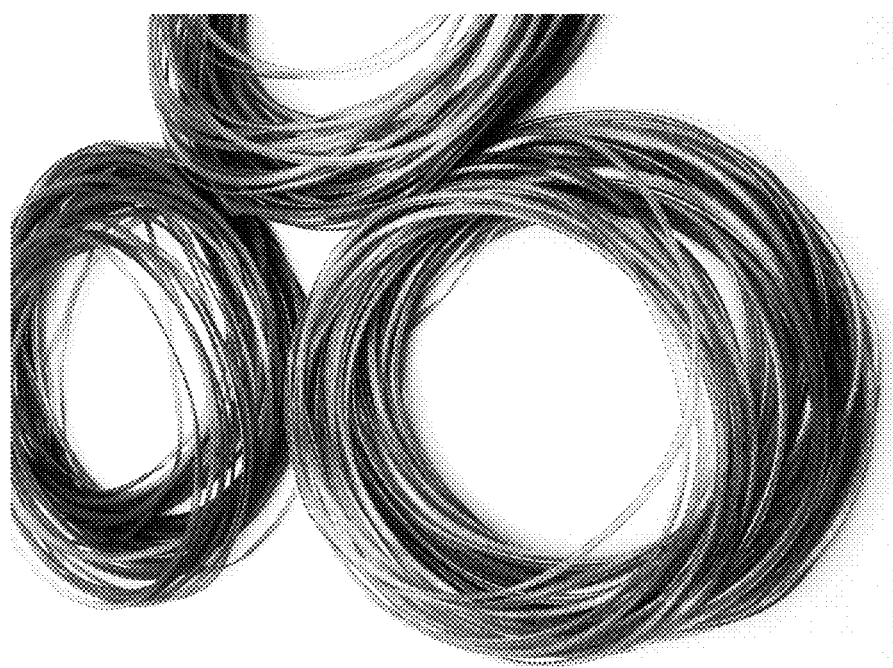
Figure 29:
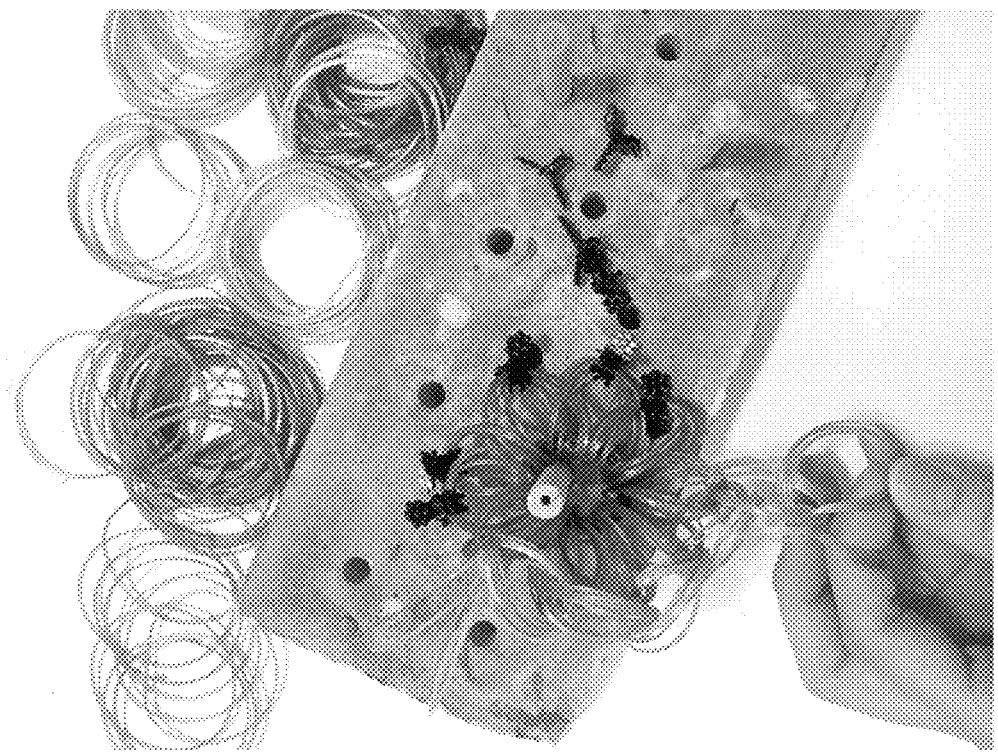
Figure 30:
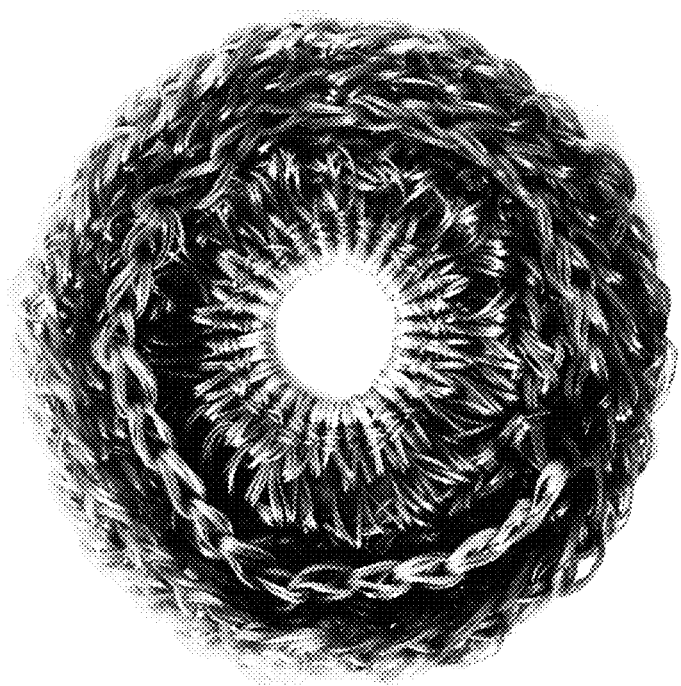
Figure 31:
Figure 32:
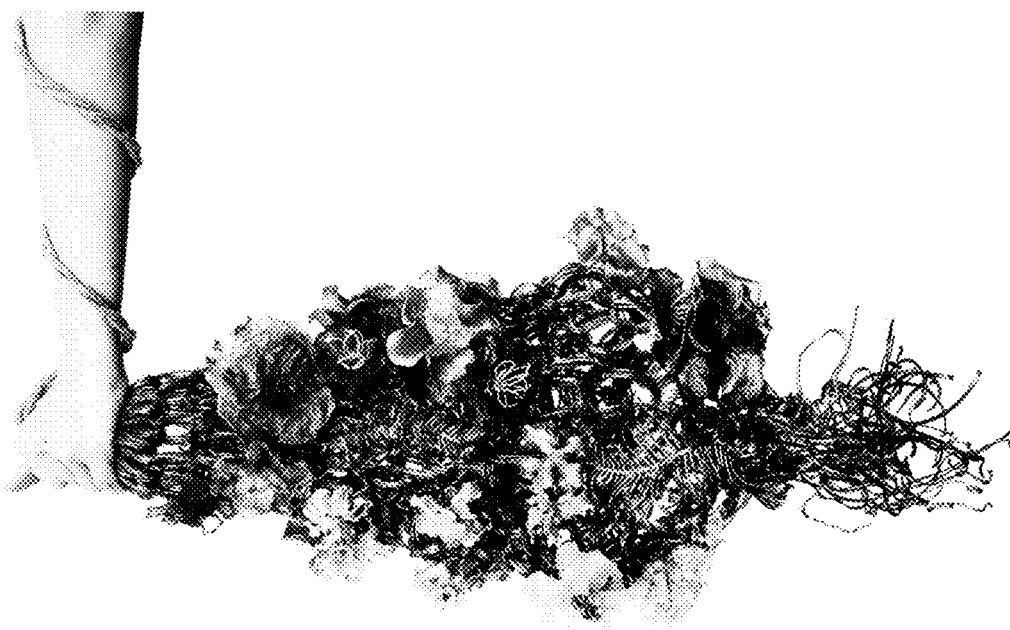
Figure 33:
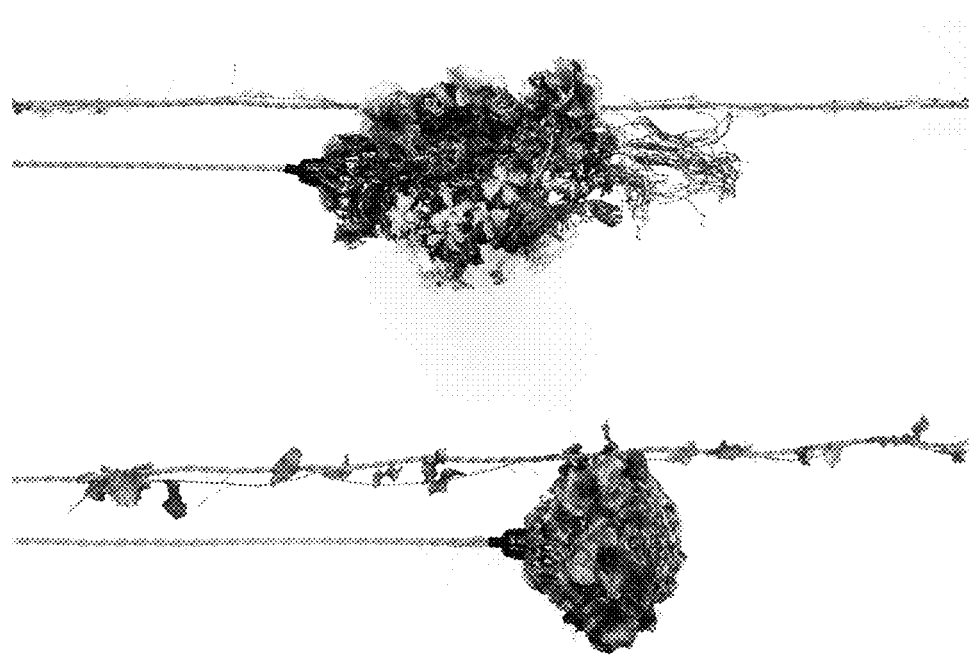
Figure 34:
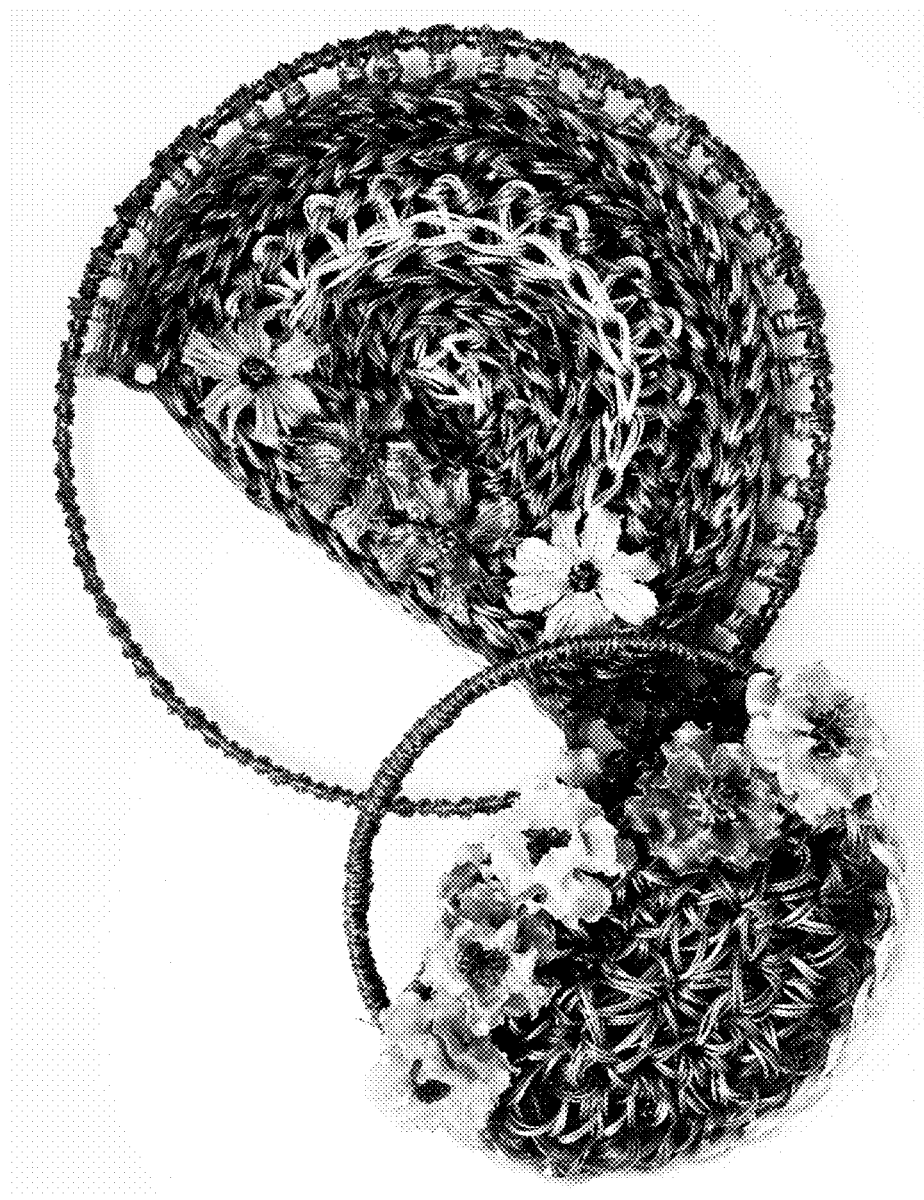
Figure 35:
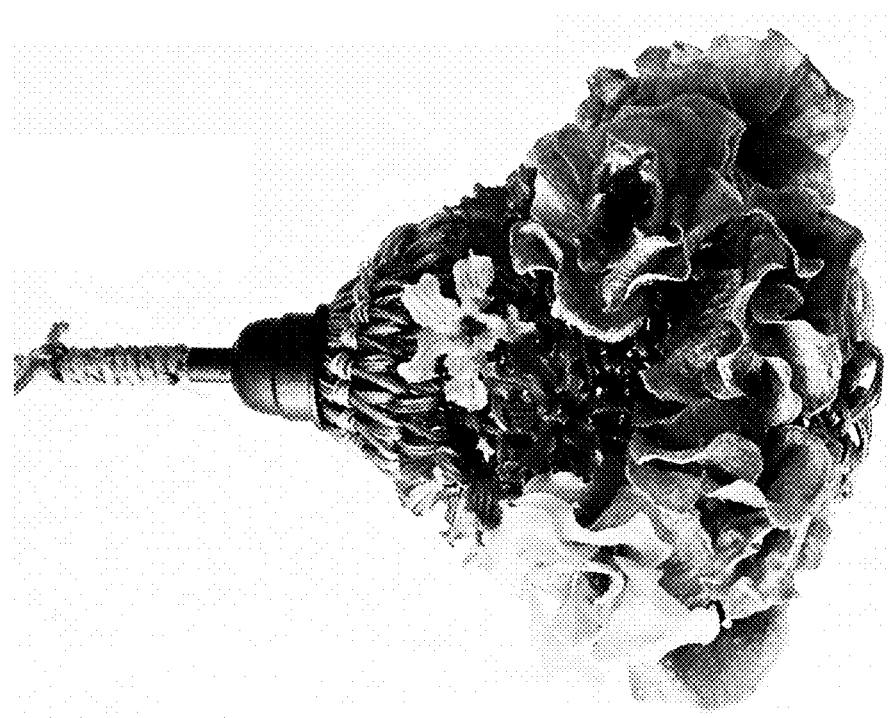
Figure 36:
FIGS. 36-40 illustrate still more productions using the solidified, agar-based mixture, according to exemplary embodiments.
Figure 37:
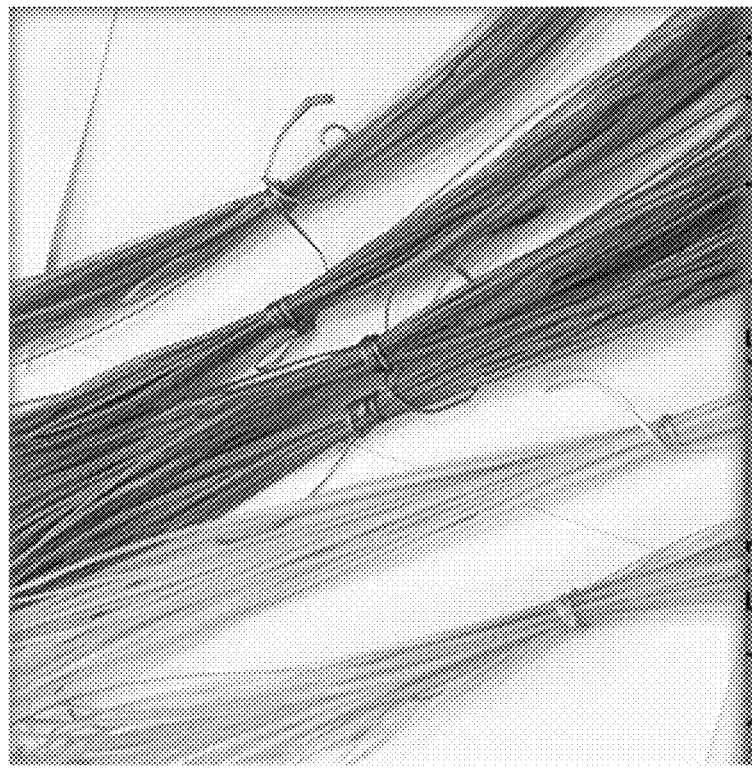

FIGS. 27-35 illustrate additional productions using the solidified, agar-based mixture 22, according to exemplary embodiments. FIG. 27, for example, illustrates the circular cavity mold 36 for molding the modular, circular shapes in FIG. 28. These modular shapes may then be combined as desired to produce extremely intricate floral arrangements and fashion accessories. As FIG. 29 illustrates, the circular shapes may then be combined, nested, intertwined, and/or woven into any bio-textile designed configuration, such as an intricate base (illustrated in FIG. 30) and stranded rope (FIG. 31). Indeed, FIGS. 32-33 illustrate a very intricate hanging artificial floral arrangements, while FIG. 34 illustrates floral baskets. FIG. 35 illustrates a hanging lamp. One or more of artificial flowers and other botanicals 20 may be linked into an over textile while constructing the base. This one-step method is efficient and results in a finished and ornamental design. The artificial flower(s) may additionally or alternatively be added afterwards onto the base by tying with the circular agar yarn. Regardless, the agar-based productions may be flexibly combined for great variability in floral arrangements.

Figure 38:
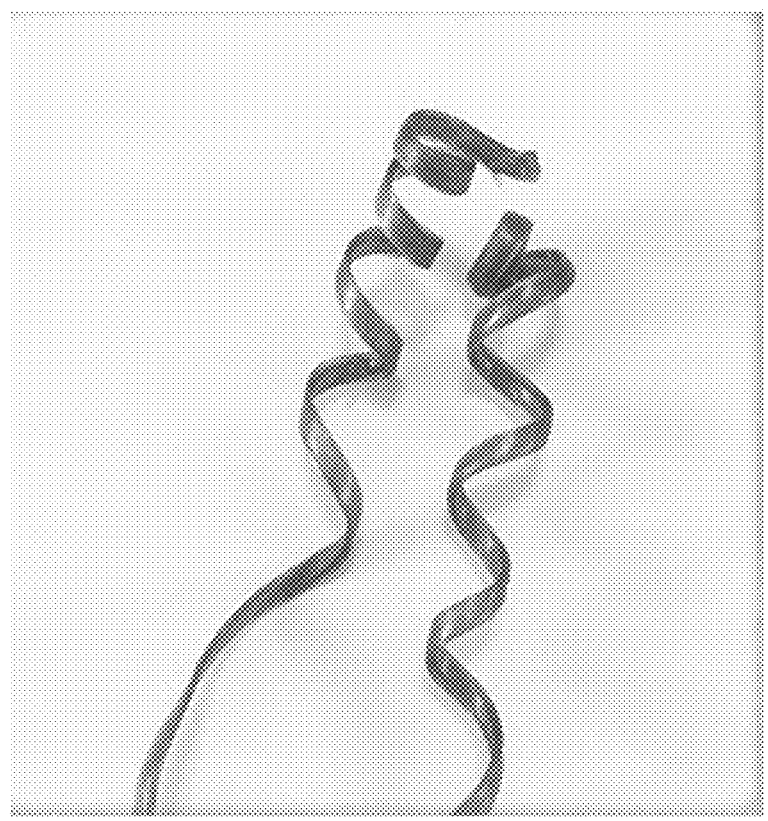
Figure 39:
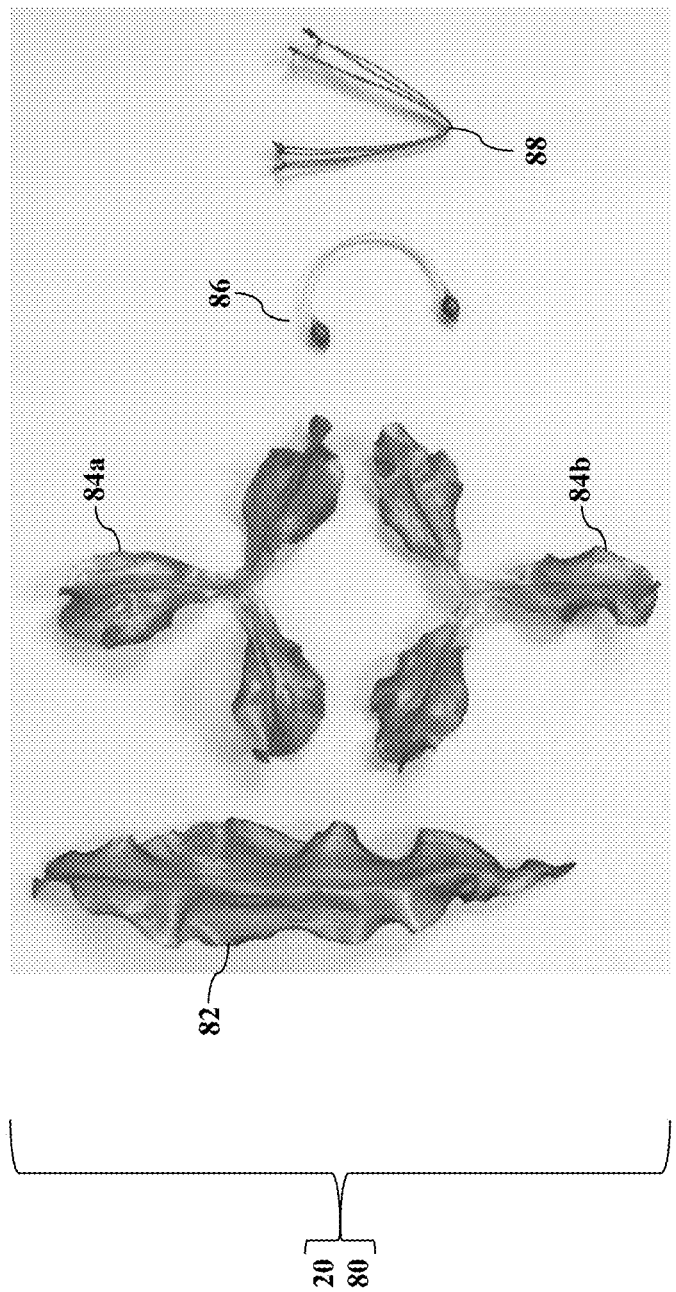
Figure 40:

FIGS. 36-40 illustrate still more productions using the solidified, agar-based mixture 22, according to exemplary embodiments. The agar-based mixture 22 may be extruded or formed and cooled as flat sheets (FIG. 36), filament strands (FIG. 37), and ribbons or yarns (FIG. 38). FIG. 39 illustrates the artificial botanical 20 as an artificial lily assemblage 80 comprising an artificial leaf 82, multiple artificial petals 84a and 84b, an artificial pistil 86, and an artificial stamen 88. The artificial components illustrated in FIG. 39 may thus be assembled as the artificial lily assemblage 80, as FIG. 40 illustrates.

FIGS. 41-43 illustrate recipes using the solidified, agar-based mixture 22, according to exemplary embodiments.

Figure 44:
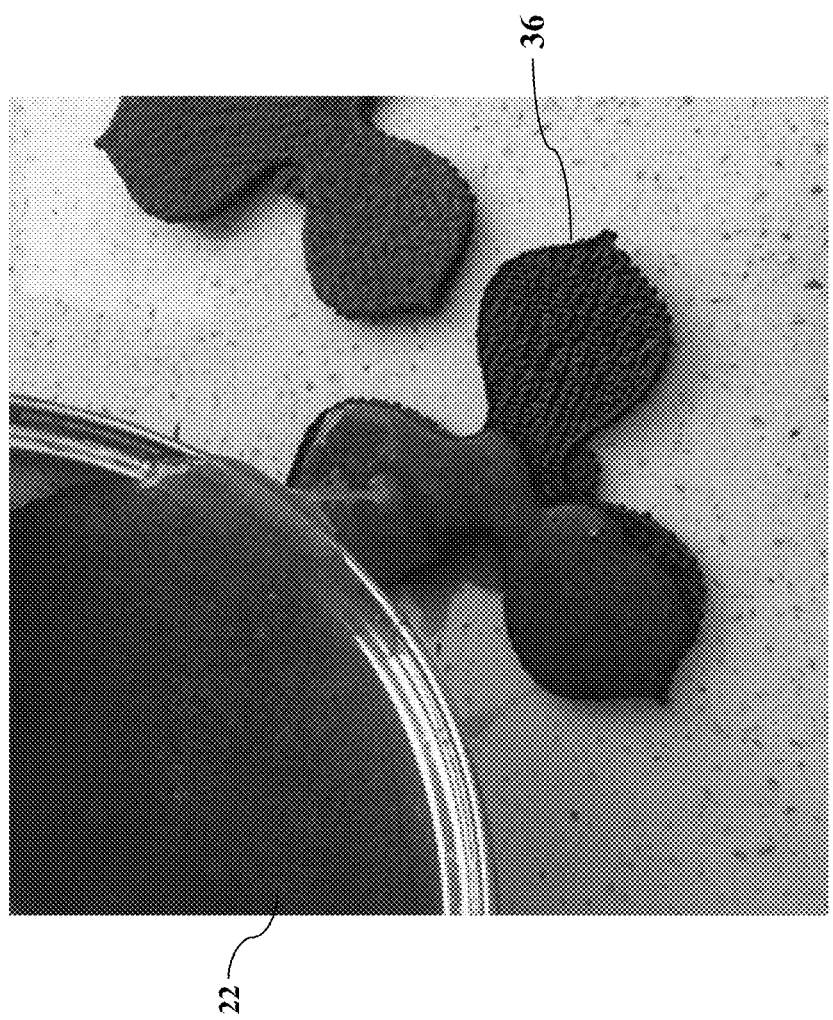
FIGS. 44-46 illustrate different material delivery techniques, according to exemplary embodiments.
Figure 45:
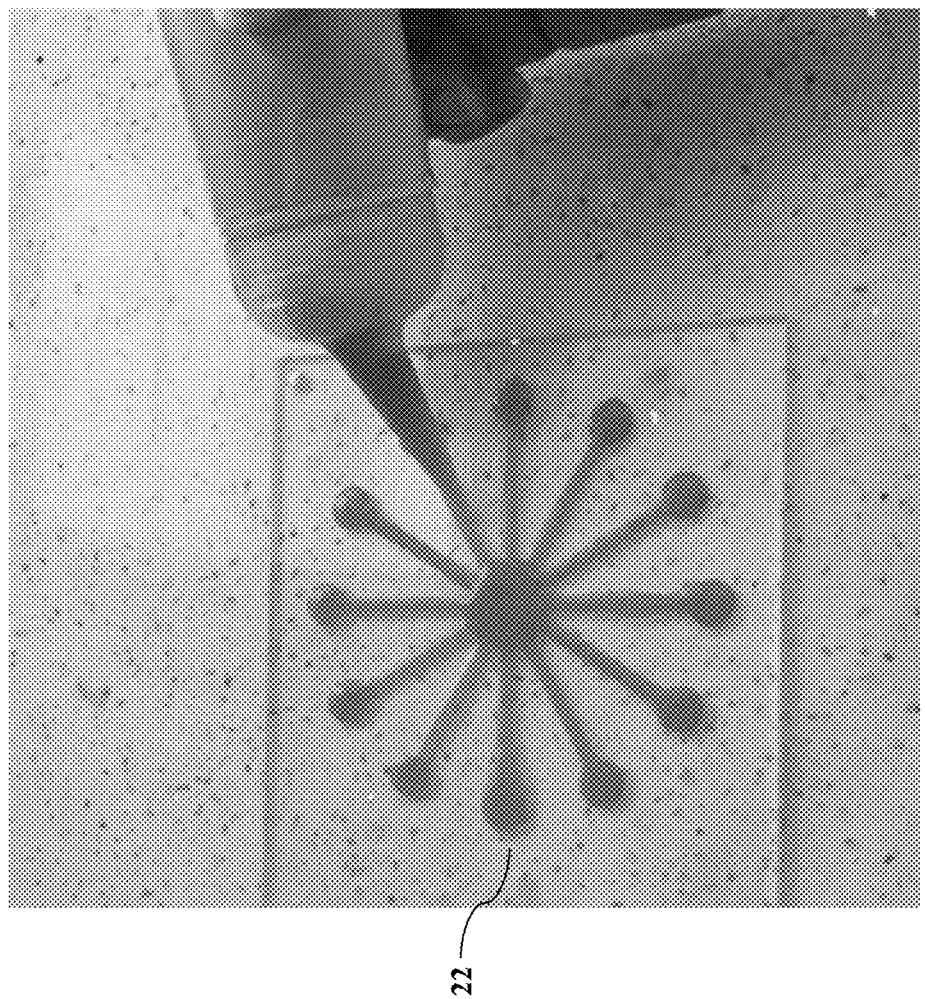
Figure 46:
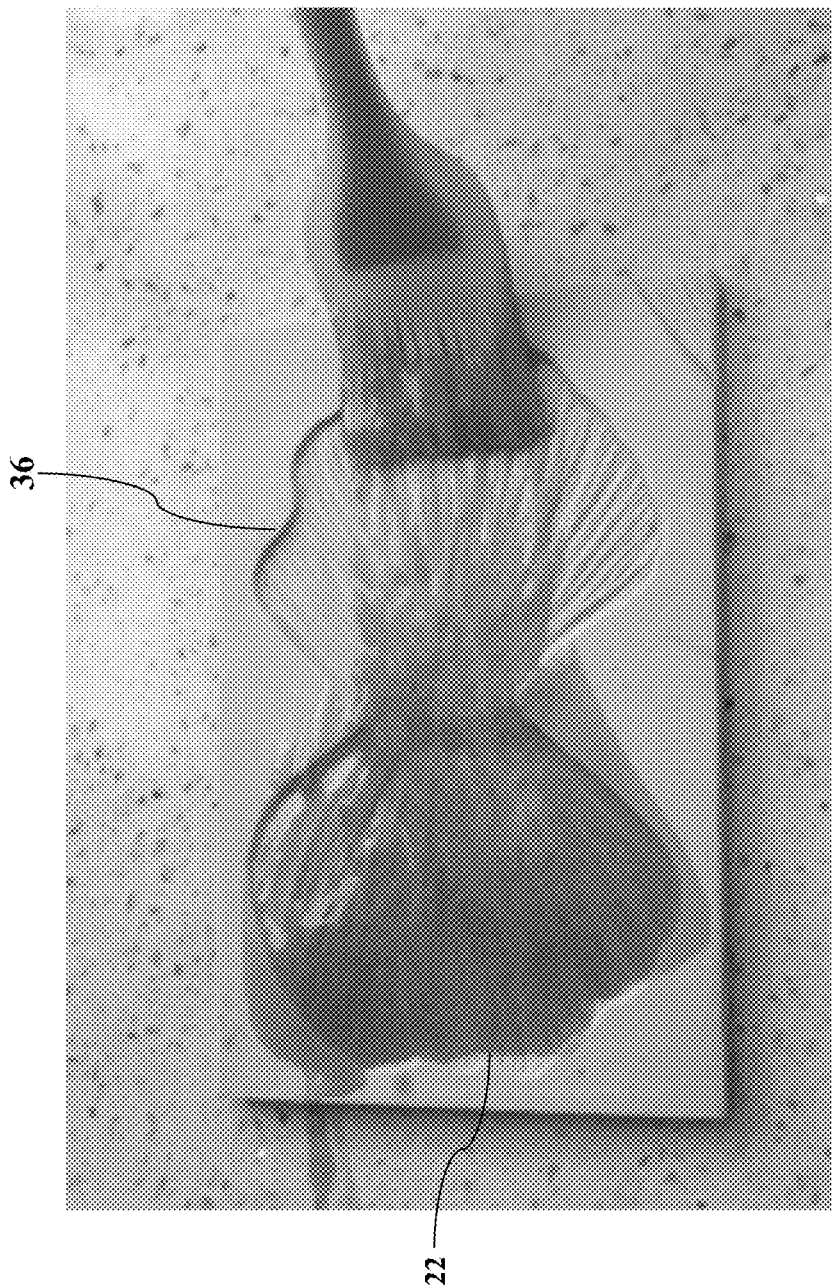
Figure 49:
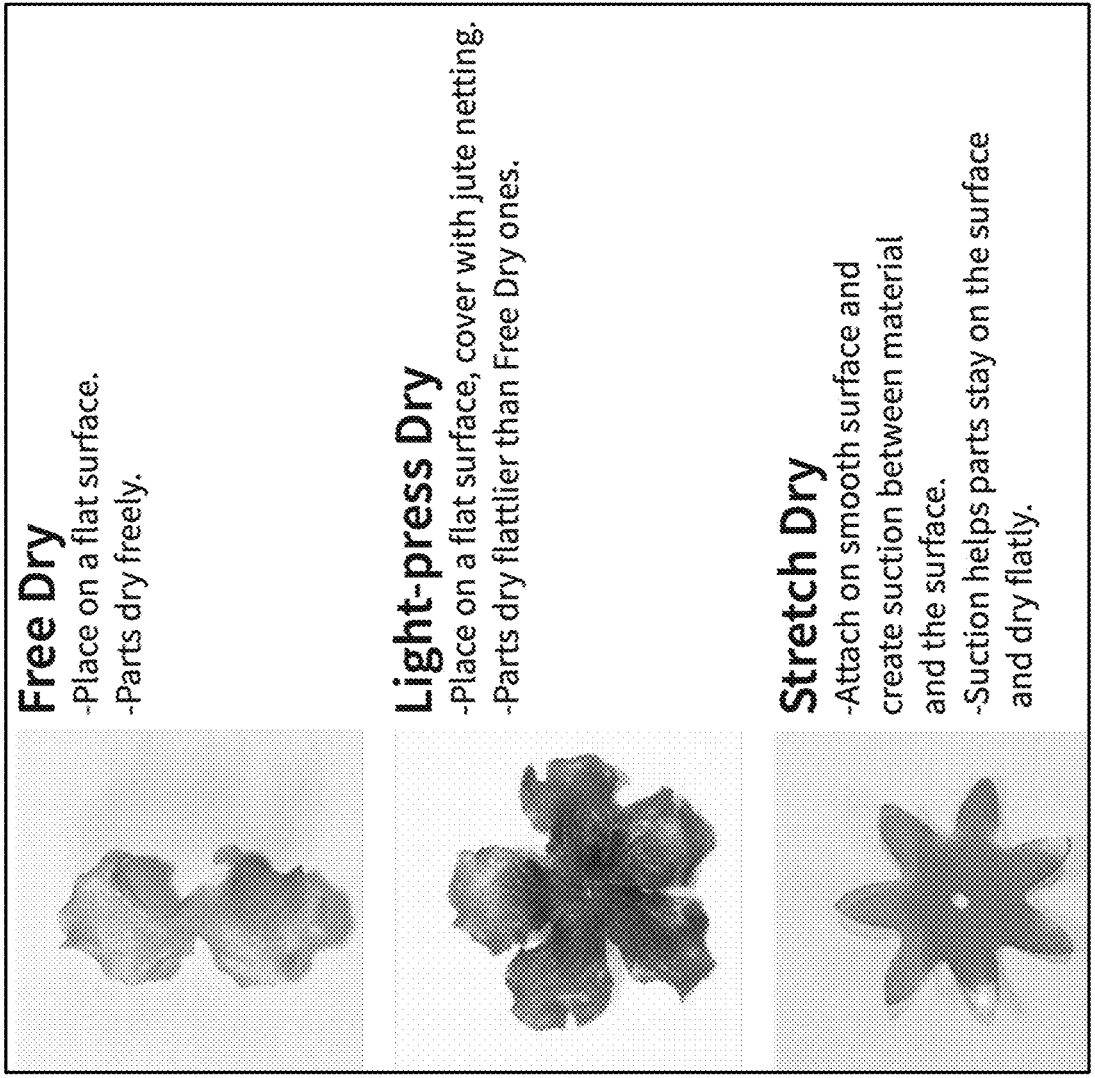

FIGS. 44-46 illustrate different material delivery techniques, according to exemplary embodiments. The agar-based mixture 22 (whether additionally colored, soapy, and/or wooly) may be poured onto over the cavity mold 36, as FIG. 44 illustrates. However, the agar-based mixture 22 may be extruded and applied or guided into the desired. FIG. 45, for example, illustrates a prototype extrusion process in which the heated agar-based mixture 22 is loaded or poured into a squeeze bottle and extruded under pressure through an outlet nozzle. The prototype extrusion process was manually-guided by hand, but high-volume production may utilize machinery programmed to trace a predetermined path or design. FIG. 46 illustrates a prototype brush applique in which the heated agar-based mixture 22 is applied by a bristled brush to the cavity mold 36. Again, high-volume production may utilize machinery programmed to brush, roll, or otherwise apply the agar-based mixture 22 in a predetermined path or design.

FIGS. 47-48 illustrate different dehumidification techniques, according to exemplary embodiments. As explained with reference to FIGS. 4-8, solidification may require hours, especially when only exposed to ambient conditions (e.g., typical room temperature and humidity). As FIGS. 47-48 illustrate, many different prototype experiments have used different processes to speed solidification and to increase throughput, especially for a high-volume production environment. These prototype experiments were conducted to reduce times to solidification. However, these prototype experiments also revealed that some drying techniques also resulted in variations in texture and form of the resulting artificial botanical 20. For example, heated drying of prototypes reduced solidification times, and heated convection drying further reduced solidification times. Preheating the cavity mold 36 (such as from about 100° C. or 212° F. to even higher temperatures, depending on any desired outcome) was seen to cause immediate flashing or scorching and evaporation, but the resultant artificial botanical 20 exhibited a shinier surface effect and a stiffer texture. Freeze drying was also tried for a minimum of fifteen (15) minutes, with some prototype samples solidifying quicker/faster than without freeze drying. Freeze drying of the agar-based mixture 22 was observed to create a different texture. This texture was more porous, and opaquer, that ambient air drying. Moreover, prototype freeze drying also seemed to produce smaller shrinkage in size. Depending on the time the agar-based mixture 22 stays in the freezer, the shrinkage of the outcome could be 10%-70% less than any other drying methods overall.

Exemplary embodiments may be applied to construct any utilitarian product. For example, multiple artificial botanicals 20 may be combined, perhaps in different colors and shapes and designs, to produce artificial bouquets for weddings, displays, and desserts. The agar-based mixture 22 may be used to create lampshades, light fixtures, wall pieces, room dividers, window coverings, and other home decorating articles. The agar-based mixture 22 may be used to create fashion and clothing accessories, such as handbags, purses, pins, corsages, and jewelry.

Exemplary embodiments are 100% recyclable. The agar may be harvested from natural seaweed and/or up-recycled from food waste. The colorant 60 is preferably natural mica power and edible. Indeed, the colorant 60 may also be produced from food waste. The woolen additive is also all-natural and may be sourced from woolen waste.

Exemplary embodiments may also include scents and flavors. Just as the colorant 60 may be added, artificial flowers and other botanicals 20 may be scented to improve their realism and appeal. The artificial botanical 20 may thus be scented by adding a perfume, odorant, or other scent. Because the artificial botanical 20 is produced using the aqueous agar-based solidifying mixture 22, no animal-based gelatin products are used. The artificial botanical 20 may thus also be edible and satisfies vegan diets. The artificial botanical 20 may thus also be flavored by adding a flavoring, such as fruit, concentrate, or sweetener. The artificial botanical 20 may remain all-natural and edible, thus being readily used as culinary garnishment for cakes and other desserts.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. An artificial flower process of fabricating an artificial flower, comprising:
producing an agar-based mixture by mixing only agar, glycerin, and water;
producing a boiled agar-based mixture by boiling the agar-based mixture;
producing a soapy boiled agar-based mixture by adding a soap to the boiled agar-based mixture that mixes only the agar, the glycerin, and the water;
producing a woolly soapy boiled agar-based mixture by adding a wool material to the soapy boiled agar-based mixture;
flower cavity casting the woolly soapy boiled agar-based mixture in a flower mold cavity;
solidifying the artificial flower by cooling the woolly soapy boiled agar-based mixture cavity casted in the flower mold cavity; and
removing the artificial flower from the flower mold cavity.

2. The artificial flower process of claim 1, wherein the producing of the woolly soapy boiled agar-based mixture further comprises adding the wool material to the soapy boiled agar-based mixture at 1:2 ratio of the agar by weight.

3. The artificial flower process of claim 1, further comprising producing a colored agar-based mixture by adding a colorant to the agar-based mixture.

4. The artificial flower process of claim 1, further comprising producing a colored agar-based mixture by adding a colorant prior to the boiling of the agar-based mixture.

5. The artificial flower process of claim 1, further comprising drilling a bore in the artificial flower.

6. The artificial flower process of claim 5, further comprising inserting a fastener through the bore.

7. The artificial flower process of claim 1, wherein the cooling of the woolly soapy boiled agar-based mixture cavity casted in the flower mold cavity further comprises air drying.

8. The artificial flower process of claim 1, wherein the cooling of the woolly soapy boiled agar-based mixture cavity casted in the flower mold cavity further comprises freeze drying.

9. The artificial flower process of claim 1, wherein the cooling of the woolly soapy boiled agar-based mixture cavity casted in the flower mold cavity further comprises heated drying.

10. The artificial flower process of claim 1, further comprising removing a source of heat prior to the adding of the wool material to the soapy boiled agar-based mixture.

11. The artificial flower process of claim 1, further comprising mixing the soapy boiled agar-based mixture.

12. The artificial flower process of claim 1, further comprising coloring the artificial flower after the removing from the flower mold cavity.

13. The artificial flower process of claim 1, further comprising coloring a portion of the artificial flower after the removing from the flower mold cavity.

14. The artificial flower process of claim 1, wherein the producing of the agar-based mixture mixes the agar, the glycerin, and the water at a 2:1:30 ratio by weight.

15. An artificial flower process of fabricating an all-natural, edible, and vegan artificial flower, comprising:
producing an aqueous agar-based artificial flower mixture by mixing only agar, glycerin, and water at a 2:1:30 ratio by weight;

producing a boiled agar-based artificial flower mixture by boiling the aqueous agar-based artificial flower mixture;

producing a soapy boiled agar-based artificial flower mixture by adding a soap to the boiled agar-based artificial flower mixture;

producing a woolly soapy boiled agar-based artificial flower mixture by adding a wool material to the soapy boiled agar-based artificial flower mixture;

cavity casting the all-natural, edible, and vegan artificial flower by pouring the woolly soapy boiled agar-based artificial flower mixture in a flower-shaped mold cavity;

solidifying the all-natural, edible, and vegan artificial flower by cooling the cavity casting of the all-natural, edible, and vegan artificial flower in the flower-shaped mold cavity; and removing the all-natural, edible, and vegan artificial flower from the flower-shaped mold cavity.

16. The artificial flower process of claim 15, further comprising drilling a bore in the all-natural, edible, and vegan artificial flower.

17. The artificial flower process of claim 16, further comprising inserting a fastener through the bore.

18. The artificial flower process of claim 15, wherein the solidifying of the all-natural, edible, and vegan artificial flower further comprises at least one of air drying, freeze drying, or heated drying of the all-natural, edible, and vegan artificial flower in the flower-shaped mold cavity.

19. The artificial flower process of claim 15, further comprising mixing the soapy boiled agar-based mixture.

20. The artificial flower process of claim 15, further comprising coloring the all-natural, edible, and vegan artificial flower after the removing from the flower-shaped mold cavity.

* * * * *